United States Patent
Cai et al.

(10) Patent No.: US 12,210,577 B2
(45) Date of Patent: Jan. 28, 2025

(54) METHOD AND APPARATUS FOR TRAINING SEARCH RECOMMENDATION MODEL, AND METHOD AND APPARATUS FOR SORTING SEARCH RESULTS

(71) Applicant: HUAWEI TECHNOLOGIES CO., LTD., Guangdong (CN)

(72) Inventors: Guohao Cai, Shenzhen (CN); Gang Wang, Shenzhen (CN); Zhenhua Dong, Shenzhen (CN); Xiaoguang Li, Shenzhen (CN); Xiuqiang He, Shenzhen (CN); Hong Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 17/989,719

(22) Filed: Nov. 18, 2022

(65) Prior Publication Data

US 2023/0088171 A1 Mar. 23, 2023

Related U.S. Application Data

(63) Continuation of application No. PCT/CN2021/093618, filed on May 13, 2021.

(30) Foreign Application Priority Data

May 19, 2020 (CN) .......................... 202010424719.3

(51) Int. Cl.
*G06F 16/00* (2019.01)
*G06F 16/9535* (2019.01)
*G06F 16/954* (2019.01)

(52) U.S. Cl.
CPC ........ *G06F 16/9535* (2019.01); *G06F 16/954* (2019.01)

(58) Field of Classification Search
None
See application file for complete search history.

(56) References Cited

U.S. PATENT DOCUMENTS

| 2015/0269163 A1* | 9/2015 | Sun | G06F 16/24578 |
| | | | 707/728 |
| 2018/0204111 A1* | 7/2018 | Zadeh | G06V 10/764 |
| 2018/0285682 A1* | 10/2018 | Najibi | G06T 7/194 |

FOREIGN PATENT DOCUMENTS

| CN | 106156023 A | * | 11/2016 | ....... G06F 17/30867 |
| CN | 103886047 B | * | 7/2017 | ....... G06F 17/30867 |

(Continued)

OTHER PUBLICATIONS

A Sample Weight Setting Method And Device, And Electronic Apparatus, Zhang et al., (Year: 2017).*

(Continued)

*Primary Examiner* — Jean M Corrielus

(57) ABSTRACT

A method and an apparatus for training a search recommendation model, and a method and an apparatus for sorting search results are provided. The training method includes: obtaining a training sample set including a sample user behavior group sequence and a masked sample user behavior group sequence; and using the training sample set as input data, and training a search recommendation model, to obtain a trained search recommendation model, where a target of the training is to obtain the object of the response operation of the sample user after the mask processing, the search recommendation model is used to predict a label of a candidate recommendation object in search results corresponding to a query field when a target user inputs the query field, and the label is used to indicate a probability that the target user performs a response operation on the candidate recommendation object.

20 Claims, 13 Drawing Sheets

(56) References Cited

FOREIGN PATENT DOCUMENTS

| CN | 107341176 A | * | 11/2017 | ....... G06F 16/24578 |
| CN | 109460513 A | * | 3/2019 | ......... G06Q 30/0251 |
| CN | 109522483 A | * | 3/2019 | ........... G06K 9/6256 |
| CN | 109582868 A | | 4/2019 | |
| CN | 109634827 A | * | 4/2019 | .......... G06F 11/3438 |
| CN | 110162703 A | * | 8/2019 | |
| CN | 111950593 A | * | 11/2020 | ....... G06F 17/30867 |
| CN | 112182362 A | * | 1/2021 | ....... G06F 17/30867 |

OTHER PUBLICATIONS

Fei Sun et al, BERT4Rec: Sequential Recommendation with Bidirectional Encoder Representations from Transformer, Apr. 14, 2019, 11 pages.

Extended European Search Report issues in EP21809139.5, dated Aug. 21, 2023, 9 pages.

* cited by examiner

500

---

Obtain a training sample set, where the training sample set includes a sample user behavior group sequence and a masked sample user behavior group sequence, the sample user behavior group sequence includes a first query field and an object of a response operation of a sample user in search results corresponding to the first query field, and the masked sample user behavior group sequence includes a second query field and a sequence obtained after mask processing is performed on an object of a response operation of the sample user in search results corresponding to the second query field ⎯ S510

Use the training sample set as input data, and train a search recommendation model, to obtain the trained search recommendation model, where a training target is to obtain the object of the response operation of the sample user after the mask processing, the search recommendation model is used to predict a label of a candidate recommendation object in search results corresponding to a query field when a target user inputs the query field, and the label is used to indicate a probability that the target user performs a response operation on the candidate recommendation object ⎯ S520

FIG. 5

METHOD AND APPARATUS FOR TRAINING SEARCH RECOMMENDATION MODEL, AND METHOD AND APPARATUS FOR SORTING SEARCH RESULTS

CROSS-REFERENCE TO RELATED APPLICATIONS

This application is a continuation of International Application No. PCT/CN2021/093618, filed on May 13, 2021, which claims priority to Chinese Patent Application No. 202010424719.3, filed on May 19, 2020. The disclosures of the aforementioned applications are hereby incorporated by reference in their entireties.

TECHNICAL FIELD

The present disclosure relates to the artificial intelligence field, and more specifically, to a method and an apparatus for training a search recommendation model, and a method and an apparatus for sorting search results.

BACKGROUND

Selectivity prediction indicates predicting a probability that a user selects a commodity in a specific environment. For example, selectivity prediction based on a search word (also referred to as a query word or a query field) input by the user plays a key role in a search recommendation system of applications such as an application store and an online advertisement. For example, objects in a candidate set corresponding to the query word may be sorted based on the selectivity prediction, to generate search results. User experience can be improved through the selectivity prediction.

Currently, in the search recommendation system, the search results may be generated through sorting the objects in the candidate set by using a sorting function of learning associations between objects in a search word-candidate set. However, only static information of the current search, that is, information of the search word is considered in the foregoing sorting function. Different users obtain the same sorted search results when inputting the same search word. In other words, accuracy of search results obtained based on a current search recommendation model is relatively low, and requirements of different users cannot be met; and therefore, user experience is relatively poor.

Therefore, how to improve accuracy of the search recommendation model and improve user experience is a problem that needs to be urgently resolved.

SUMMARY

The present disclosure provides a method and an apparatus for training a search recommendation model, and a method and an apparatus for sorting search results, to improve accuracy of the search recommendation model and accuracy of the feedback search results.

According to a first aspect, a method for training a search recommendation model is provided, including: obtaining a training sample set, where the training sample set includes a sample user behavior group sequence and a masked sample user behavior group sequence, the sample user behavior group sequence includes a first query field and an object of a response operation of a sample user in search results corresponding to the first query field, and the masked sample user behavior group sequence includes a second query field and a sequence obtained after mask processing is performed on an object of a response operation of the sample user in search results corresponding to the second query field; and using the training sample set as input data, and training a search recommendation model, to obtain the trained search recommendation model, where a training target is to obtain the object of the response operation of the sample user after the mask processing, the search recommendation model is used to predict a label of a candidate recommendation object in search results corresponding to a query field when a target user inputs the query field, and the label is used to indicate a probability that the target user performs a response operation on the candidate recommendation object.

It should be understood that the foregoing sample user behavior group sequence may be a group of data that is of the sample user and that is sorted in a time sequence, for example, behavior log data of the sample user.

In a possible implementation, the training sample set may be data obtained from a user behavior log of the sample user, and includes a historical query field of the sample user and a response operation of the sample user to a candidate recommendation object in search results corresponding to the historical query field, for example, operations performed by the sample user on a candidate recommendation object in search results corresponding to a query field such as a click operation, a download operation, a purchase operation, and a browse operation.

In a possible implementation, the candidate recommendation object may include any one of a document, a service product, an advertisement, and an application.

In a possible implementation, the label of the candidate recommendation object may be an evaluation score of the candidate recommendation object corresponding to the query field. A candidate recommendation object with a higher evaluation score may indicate a higher probability that the user performs a response operation on the candidate recommendation object based on historical behavior data of the user. In this case, the candidate recommendation object may be placed at a front location in the search results.

In this embodiment, in a process of training the search recommendation model, data that includes the query field of the user and the response operation of the user may be used, so that the search recommendation model can learn, based on historical behavior logs of different users, an association relationship between the query field and the response operation of the user. In other words, the search recommendation model in the present disclosure can be effectively trained by using the historical behavior data of the user, so that the trained search recommendation model can predict a label of a candidate recommendation object in search results corresponding to a query field when the user inputs the query field. A search intention of the user can be recognized based on the label of the candidate recommendation object, to improve accuracy of feedback search results, that is, improve accuracy of the search recommendation model.

In a possible implementation, the training sample set may include a plurality of pieces of sample data. The plurality of pieces of sample data may be historical behavior group sequences of the same sample user that are obtained based on the historical behavior data of the user.

For example, a plurality of historical behavior group sequences of a user A is obtained from a user behavior log of the sample user A, and one of the plurality of historical behavior group sequences includes a historical query field of the sample user A and an object of a response operation of the sample user A in search results corresponding to the historical query field. Based on the plurality of historical behavior group sequences of the sample user A, the search recommendation model can learn an association relationship between the historical query field in the plurality of historical behavior group sequences of the sample user A and the object of the historical response operation, to improve accuracy of the search recommendation model when the sample user A inputs the current query field.

It should be understood that the sample data in the training sample set may be data generated based on an operation behavior of a real user, or the sample data included in the training sample set may be data constructed by using an algorithm, that is, the sample data may not be generated based on an operation behavior of a real user. In a possible implementation, the masked sample user behavior group sequence may indicate that mask processing is performed on an obtained original user behavior group sequence. For example, a specific proportion of user behavior group sequences may be randomly sampled from original user behavior group sequences. For the sampled user behavior group sequence, an operation object of a response behavior of the user is masked. A specific mask manner may be replacing an original object with a special 'MASK' symbol.

With reference to the first aspect, in some implementations of the first aspect, the search recommendation model predicts the label of the candidate recommendation object based on the query field input by the target user and the historical behavior group sequence of the target user. The historical behavior group sequence of the target user is obtained based on the historical query field of the target user and the historical behavior data corresponding to the historical query field. The historical behavior data corresponding to the historical query field is an object of a response operation performed by the target user on the search results corresponding to the historical query field.

With reference to the first aspect, in some implementations of the first aspect, the sample user behavior group sequence further includes identification information. The identification information is used to indicate an association relationship between the first query field and the object of the response operation of the sample user. The identification information includes a time identifier.

In a possible implementation, the obtaining of a training sample set includes: obtaining the first query field and data of the object of the response operation of the sample user; and performing binding processing on the first query field and the object of the response operation of the sample user corresponding to the first query field, to obtain the sample user behavior group sequence.

In this embodiment, in order that the association relationship between the query field and the response behavior of the user can be learned in the process of training the search recommendation model, that is, the query field and the response operation performed by the user on the candidate recommendation object in the search results corresponding to the query field can be learned, relatively independent query field data in the user behavior log may be bound to user response field data, to obtain training sample data, that is, a user behavior group sequence.

In a possible implementation, the performing of binding processing on the first query field and the response operation of the sample user corresponding to the first query field includes:
adding identification information to the first query field and the object of the response operation of the sample user corresponding to the first query field, where the identification information includes a time identifier.

With reference to the first aspect, in some implementations of the first aspect, the search recommendation model is a bidirectional encoder representations from transformers (BERT) model. The method further includes performing vectorization processing on the sample user behavior group sequence and the masked sample user behavior group sequence, to obtain a vector sequence.

The using of the training sample set as input data includes inputting the vector sequence to the BERT model.

In this embodiment, the search recommendation model may be the bidirectional encoder representations from transformers (BERT) model. Further, in order that the search recommendation model can recognize a format of the training sample set, vectorization processing may be performed on the data in the training sample set, that is, a multi-element group sequence may be converted into a vector sequence.

With reference to the first aspect, in some implementations of the first aspect, the response operation of the sample user includes one or more of a click operation, a download operation, a purchase operation, or a browse operation of the sample user.

According to a second aspect, a method for sorting search results is provided, including: obtaining a to-be-processed user behavior group sequence of a user, where the to-be-processed user behavior group sequence includes a current query field of the user and a sequence obtained after mask processing is performed on an object of a response operation of the user:
inputting the to-be-processed behavior group sequence to a pre-trained search recommendation model, to obtain a label of a candidate recommendation object in a candidate recommendation object set corresponding to the current query field, where the label is used to indicate a probability that the user performs a response operation on the candidate recommendation object in the candidate recommendation object set; and
obtaining, based on the label of the candidate recommendation object, sorted search results corresponding to the current query field, where the search recommendation model is used to predict a label of a candidate recommendation object in search results corresponding to a query field when a target user inputs the query field, the search recommendation model is obtained through using a training sample set as input data and performing training with a training target of obtaining an object of a response operation of a sample user after mask processing, the training sample set includes a sample user behavior group sequence and a masked sample user behavior group sequence, the sample user behavior group sequence includes a first query field and an object of a response operation of a sample user in search results corresponding to the first query field, and the masked sample user behavior group sequence includes a second query field and a sequence obtained after mask processing is performed on an object of a response operation of the sample user in search results corresponding to the second query field.

It should be understood that the foregoing sample user behavior group sequence may be a group of data that is of the sample user and that is sorted in a time sequence, for example, behavior log data of the sample user.

In a possible implementation, the training sample set may be data obtained from a user behavior log of the sample user, and includes a historical query field of the sample user and a response operation of the sample user to a candidate recommendation object in search results corresponding to the historical query field, for example, operations performed by the sample user on a candidate recommendation object in search results corresponding to a query field such as a click operation, a download operation, a purchase operation, and a browse operation.

In a possible implementation, the candidate recommendation object may be a document, a service product, an advertisement, or an application.

In a possible implementation, the label of the candidate recommendation object may be an evaluation score of the candidate recommendation object corresponding to the query field. A candidate recommendation object with a higher evaluation score may indicate a higher probability that the user performs a response operation on the candidate recommendation object based on historical behavior data of the user. In this case, the candidate recommendation object may be placed at a front location in search results.

In this embodiment, the label of the candidate recommendation object in the candidate recommendation object set corresponding to the current query field may be obtained by using the pre-trained search recommendation model. The label may be used to indicate a probability that the user performs the response operation on the candidate recommendation object in the candidate recommendation object set. The sorted search results corresponding to the current query field are obtained based on the label of the candidate recommendation object. In a process of training the search recommendation model, data that includes the query field of the user and the response operation of the user may be used, so that the search recommendation model can learn, based on historical behavior logs of different users, an association relationship between the query field and the response operation of the user. In other words, the search recommendation model in this disclosure can be effectively trained by using historical behavior data of the user, so that the trained search recommendation model can predict a label of a candidate recommendation object in search results corresponding to a query field when the user inputs the query field. A search intention of the user can be recognized based on the label of the candidate recommendation object, to improve sorting accuracy of the search results.

In a possible implementation, the masked sample user behavior group sequence may indicate that mask (MASK) processing is performed on an obtained original user behavior group sequence. For example, a specific proportion of user behavior group sequences may be randomly sampled from original user behavior group sequences. For the sampled user behavior group sequence, an operation object of a response behavior of the user is masked. A specific mask manner may be replacing an original object with a special 'MASK' symbol.

With reference to the second aspect, in some implementations of the second aspect, the search recommendation model predicts the label of the candidate recommendation object based on the query field input by the target user and the historical behavior group sequence of the target user. The historical behavior group sequence of the target user is obtained based on the historical query field of the target user and the historical behavior data corresponding to the historical query field. The historical behavior data corresponding to the historical query field is an object of a response operation performed by the target user on the search results corresponding to the historical query field.

In a possible implementation, the sample user behavior group sequence is obtained through performing binding processing on the first query field of the sample user and the object of the response operation of the sample user.

In this embodiment, in order that the association relationship between the query field and the response behavior of the user can be learned in the process of training the search recommendation model, that is, the query field and the response operation performed by the user on the candidate recommendation object in the search results corresponding to the query field can be learned, relatively independent query field data in the user behavior log may be bound to user response field data, to obtain training sample data, that is, a user behavior group sequence.

In a possible implementation, the sample user behavior group sequence is obtained through adding identification information to the obtained first query field of the sample user and the obtained object of the response operation of the sample user, where the identification information includes a time identifier.

With reference to the second aspect, in some implementations of the second aspect, the sample user behavior group sequence further includes identification information. The identification information is used to indicate an association relationship between the first query field and the object of the response operation of the sample user. The identification information includes a time identifier.

With reference to the second aspect, in some implementations of the second aspect, the pre-trained search recommendation model is a bidirectional encoder representations from transformers (BERT) model. The training sample set is obtained through performing vectorization processing on the sample user behavior group sequence and the masked sample user behavior group sequence.

In this embodiment, the search recommendation model may be the bidirectional encoder representations from transformers (BERT) model. Further, in order that the search recommendation model can recognize a format of the training sample set, vectorization processing may be performed on the data in the training sample set, that is, a multi-element group sequence may be converted into a vector sequence.

With reference to the second aspect, in some implementations of the second aspect, the response operation of the user includes one or more of a click operation, a download operation, a purchase operation, or a browse operation of the user.

According to a third aspect, an apparatus for training a search recommendation model is provided, including: an obtaining unit, configured to obtain a training sample set, where the training sample set includes a sample user behavior group sequence and a masked sample user behavior group sequence, the sample user behavior group sequence includes a first query field and an object of a response operation of a sample user in search results corresponding to the first query field, and the masked sample user behavior group sequence includes a second query field and a sequence obtained after mask processing is performed on an object of a response operation of the sample user in search results corresponding to the second query field; and a processing unit, configured to: use the training sample set as input data, and train a search recommendation model, to obtain the trained search recommendation model, where a training target is to obtain the object of the response operation of the sample user after the mask processing, the search recommendation model is used to predict a label of a candidate recommendation object in search results corresponding to a query field when a target user inputs the query field, and the label is used to indicate a probability that the target user performs a response operation on the candidate recommendation object.

It should be understood that extension, limitation, explanation, and description of related content in the first aspect are also applicable to the same content in the third aspect.

With reference to the third aspect, in some implementations of the third aspect, the search recommendation model predicts the label of the candidate recommendation object based on the query field input by the target user and a historical behavior group sequence of the target user. The historical behavior group sequence of the target user is obtained based on a historical query field of the target user and historical behavior data corresponding to the historical query field. The historical behavior data corresponding to the historical query field is an object of a response operation performed by the target user on the search results corresponding to the historical query field.

With reference to the third aspect, in some implementations of the third aspect, the sample user behavior group sequence further includes identification information. The identification information is used to indicate an association relationship between the first query field and the object of the response operation of the sample user. The identification information includes a time identifier.

With reference to the third aspect, in some implementations of the third aspect, the search recommendation model is a bidirectional encoder representations from transformers (BERT) model. The processing unit is further configured to: perform vectorization processing on the sample user behavior group sequence and the masked sample user behavior group sequence, to obtain a vector sequence.

The processing unit is further configured to input the vector sequence to the BERT model.

With reference to the third aspect, in some implementations of the third aspect, the response operation of the sample user includes one or more of a click operation, a download operation, a purchase operation, or a browse operation of the sample user.

According to a fourth aspect, an apparatus for sorting search results is provided, including: an obtaining unit, configured to obtain a to-be-processed user behavior group sequence of a user, where the to-be-processed user behavior group sequence includes a current query field of the user and a sequence obtained after mask processing is performed on an object of a response operation of the user; and a processing unit, configured to: input the to-be-processed behavior group sequence to a pre-trained search recommendation model, to obtain a label of a candidate recommendation object in a candidate recommendation object set corresponding to the current query field, where the label is used to indicate a probability that the user performs a response operation on the candidate recommendation object in the candidate recommendation object set; and obtain, based on the label of the candidate recommendation object, sorted search results corresponding to the current query field, where the search recommendation model is used to predict a label of a candidate recommendation object in search results corresponding to a query field when a target user inputs the query field, the search recommendation model is obtained through using a training sample set as input data and performing training with a training target of obtaining an object of a response operation of a sample user after mask processing, the training sample set includes a sample user behavior group sequence and a masked sample user behavior group sequence, the training sample set includes a sample user behavior group sequence and a masked sample user behavior group sequence, the sample user behavior group sequence includes a first query field and an object of a response operation of the sample user in search results corresponding to the first query field, and the masked sample user behavior group sequence includes a second query field and a sequence obtained after mask processing is performed on an object of a response operation of the sample user in search results corresponding to the second query field.

It should be understood that extension, limitation, explanation, and description of related content in the second aspect are also applicable to the same content in the fourth aspect.

With reference to the fourth aspect, in some implementations of the fourth aspect, the search recommendation model predicts the label of the candidate recommendation object based on the query field input by the target user and a historical behavior group sequence of the target user. The historical behavior group sequence of the target user is obtained based on a historical query field of the target user and historical behavior data corresponding to the historical query field. The historical behavior data corresponding to the historical query field is an object of a response operation performed by the target user on the search results corresponding to the historical query field.

With reference to the fourth aspect, in some implementations of the fourth aspect, the sample user behavior group sequence further includes identification information. The identification information is used to indicate an association relationship between the first query field and the object of the response operation of the sample user. The identification information includes a time identifier.

With reference to the fourth aspect, in some implementations of the fourth aspect, the pre-trained search recommendation model is a bidirectional encoder representations from transformers (BERT) model. The training sample set is obtained through performing vectorization processing on the sample user behavior group sequence and the masked sample user behavior group sequence.

With reference to the fourth aspect, in some implementations of the fourth aspect, the response operation of the user includes one or more of a click operation, a download operation, a purchase operation, or a browse operation of the user.

According to a fifth aspect, an apparatus for training a search recommendation model is provided, including an input/output interface, a processor, and a memory. The processor is configured to control the input/output interface to send and receive information. The memory is configured to store a computer program. The processor is configured to: invoke the computer program from the memory, and run the computer program, so that the training apparatus performs the training method in the first aspect and any possible implementation of the first aspect.

Optionally, the training apparatus may be a terminal device/a server, or may be a chip in a terminal device/a server.

Optionally, the memory may be located in the processor, for example, may be a cache in the processor. Alternatively, the memory may be located outside the processor to be independent of the processor, for example, an internal memory of the training apparatus.

According to a sixth aspect, an apparatus for sorting search results is provided, including an input/output interface, a processor, and a memory. The processor is configured to control the input/output interface to send and receive information. The memory is configured to store a computer program. The processor is configured to: invoke the computer program from the memory, and run the computer program, so that the apparatus performs the method in the second aspect and any possible implementation of the second aspect.

Optionally, the apparatus may be a terminal device/a server, or may be a chip in a terminal device/a server.

Optionally, the memory may be located in the processor, for example, may be a cache in the processor. Alternatively, the memory may be located outside the processor to be independent of the processor, for example, an internal memory of the apparatus.

According to a seventh aspect, a computer program product is provided. The computer program product includes computer program code. When the computer program code is run on a computer, the computer is enabled to perform the methods in the foregoing aspects.

It should be noted that all or a part of the foregoing computer program code may be stored on a first storage medium. The first storage medium may be encapsulated together with a processor, or may be encapsulated separately from a processor. This is not specifically limited in embodiments of the present disclosure.

According to an eighth aspect, a computer-readable medium is provided. The computer-readable medium stores program code. When the computer program code is run on a computer, the computer is enabled to perform the methods in the foregoing aspects.

BRIEF DESCRIPTION OF DRAWINGS

FIG. 5 is a schematic flowchart of a method for training a search recommendation model according to an embodiment of the present disclosure:

DESCRIPTION OF EMBODIMENTS

The following describes the technical solutions in embodiments of the present disclosure with reference to the accompanying drawings in embodiments of the present disclosure. It is clear that the described embodiments are merely a part rather than all of embodiments of the present disclosure. All other embodiments obtained by a person of ordinary skill in the art based on embodiments of the present disclosure without creative efforts shall fall within the protection scope of the present disclosure.

First, related concepts in embodiments of the present disclosure are briefly explained.

1. Personalized Search System

The personalized search system is a system that uses a machine learning algorithm to analyze historical data of a user, predicts a new query request on this basis, and gives personalized search results.

For example, the user inputs a search word A. The personalized search system may analyze historical behavior data of the user by using a machine learning algorithm, and predict an association degree between a commodity in the system and the search word input by the user; and further sort commodities in descending order based on the predicted association degrees or by using a function of the association degrees. The search system sequentially displays the commodities at different locations as search results for the user, and feeds back the search results to the user.

2. Offline Training

The offline training is a module, in a personalized recommendation system, that iteratively updates parameters of a recommendation model based on historical data of the user by using a machine learning algorithm until a specified requirement is met.

3. Online Inference

The online inference indicates predicting, based on a feature of the user, a commodity, and a context by using a model trained offline, a preference of the user to a recommended commodity when a current search word is input, and predicting a probability that the user selects the recommended commodity.

(4) Sequence Search

The sequence search is proposed to meet most search scenarios. It is considered that a plurality of query words of the user within a period of time may be associated with each other. Context information may be used to predict responses of the user to the search results when the user initiates a new round of search. For example, the user searches a search system, and performs various operation behavior on feedback search results, for example, query, browsing, clicking, and downloading. Personalized search results may be returned based on the predicted responses of the user to the search results.

Figure 1:
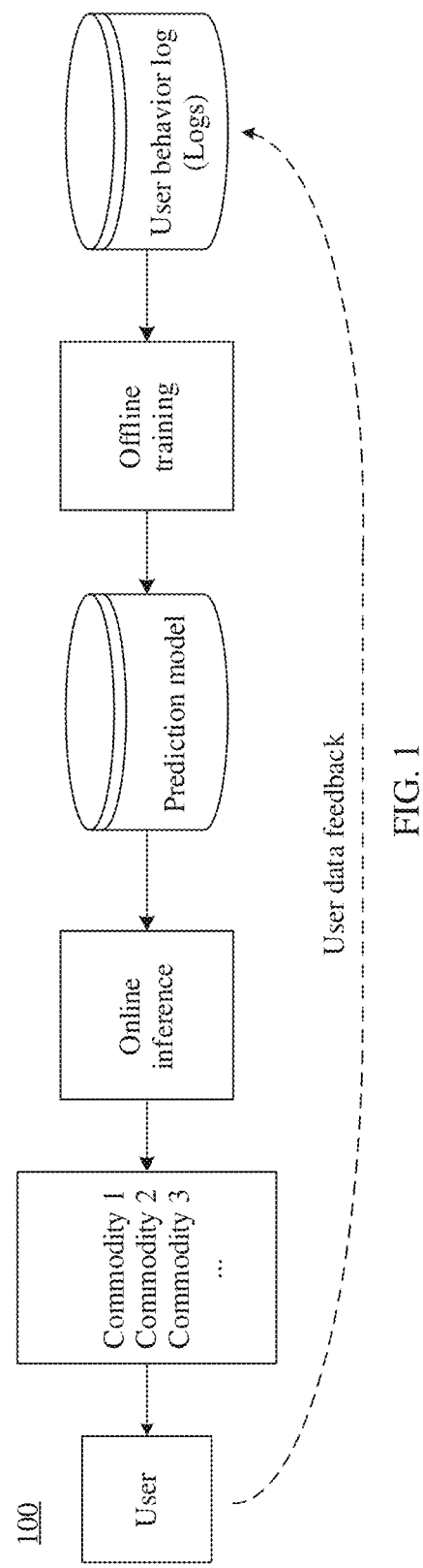
FIG. 1 is a schematic diagram of a search system according to an embodiment of the present disclosure.

For example, FIG. 1 is a schematic diagram of a search system according to an embodiment of the present disclosure.

As shown in FIG. 1, after the user uses the search system 100, the user may trigger a search request in the search system 100 (for example, the user may input a query word that may also be referred to as a search word). The search system may input the query word and other related information to a prediction model, and then predict an association degree between a commodity in the search system and the query word. Further, commodities may be sorted in descending order based on predicted association degrees or by using a function of association degrees. The search system may sequentially display the commodities at different locations as search results for the user. In this way, the user may conduct a user behavior on the feedback search results, for example, browsing, clicking, and downloading. In addition, an actual behavior of the user is stored in a log as training data. Parameters of a prediction model are continuously updated by using an offline training module, to improve a prediction effect of the model.

For example, the user opens an application store on a smart terminal. After a query word is input in a search bar, the search system of the application store may be triggered. The search system of the application store predicts, based on the response of the user such as a historical download record of the user and a click record of the user and a feature of an application, for example, environment feature information such as a time and a place, a probability that the user downloads a given application (APP). Based on a calculated result, the search system of the application store may display the search results, that is, candidate APPs in descending order of predicted probability values, to improve download probabilities of the candidate APPs.

The smart terminal may be a mobile or fixed terminal device. For example, the smart terminal may be a mobile phone, a tablet personal computer (TPC), a media player, a smart television, a laptop computer (LC), a personal digital assistant (PDA), or a personal computer (PC). This is not limited in embodiments of the present disclosure.

For example, an APP with a relatively high predicted selectivity of the user may be displayed at a front location in the search results, and an APP with a relatively low predicted selectivity of the user may be displayed at a back location in the search results.

Further, the responses of the user to the search results are also stored in a log, and the parameters of the prediction model are trained and updated by using the offline training module.

For example, in an online inference phase, the model may form an input sequence based on the current query word, a historical query word, and a download result, and directly output sorted search results.

The search recommendation model and the online inference model in the offline training may be neural network models. The following describes related terms and concepts of a neural network that may be involved in embodiments of the present disclosure.

(5) Neural Network

The neural network may include neurons. The neuron may indicate an operation unit that uses $x_s$ and an intercept 1 as input. Output of the operation unit may be as follows:

$$h_{W,b}(x) = f(W^T x) = f\left(\sum_{s=1}^{n} W_s x_s + b\right)$$

Herein, s=1, 2, ..., and n, n is a natural number greater than 1, $W_s$ is a weight of $x_s$, b is a bias of the neuron, and f is an activation function of the neuron, and is used to introduce a nonlinear feature into the neural network, to convert an input signal in the neuron into an output signal. The output signal of the activation function may be used as input of a next convolutional layer. The activation function may be a sigmoid function. The neural network is a network formed by connecting a plurality of single neurons together. To be specific, output of a neuron may be input for another neuron. An input of each neuron may be connected to a local receptive field of a previous layer to extract a feature of the local receptive field. The local receptive field may be a region including several neurons.

(6) Deep Neural Network

The deep neural network (DNN), also referred to as a multi-layer neural network, may be understood as a neural network including a plurality of hidden layers. The DNN is divided according to locations of different layers. The neural network of the DNN may be divided into three parts: an input layer, a hidden layer, and an output layer. Generally, the first layer is the input layer, the last layer is the output layer, and the middle layer is the hidden layer. The layers are fully connected to each other. In other words, any neuron at an $i^{th}$ layer must be connected to any neuron at an $(i+1)^{th}$ layer.

Although the DNN is very complex seemingly, it is not complex for work at each layer. This is simply as the following linear relational expression: $\vec{y} = \alpha(W\Box\vec{x}+\vec{b})$. Herein, $\vec{x}$ is an input vector, $\vec{y}$ is an output vector, $\vec{b}$ is a bias vector, W is a weight matrix (also referred to as a coefficient), and $\alpha()$ is an activation function. At each layer, only a simple operation is performed on the input vector $\vec{x}$ to obtain the output vector $\vec{y}$. Because the DNN has a plurality of layers, there are also a relatively large quantity of coefficients W and bias vectors $\vec{b}$. Definitions of these parameters in the DNN are as follows: The coefficient W is used as an example. It is assumed that the DNN includes three layers. A linear coefficient from a fourth neuron at a second layer to a second neuron at a third layer is defined as $W_{24}^{3}$. The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer does not have the parameter W. In the deep neural network, more hidden layers make the network more capable of describing a complex case in the real world. Theoretically, more parameters indicate a more complex model and a larger "capacity". This indicates that the model can complete a more complex learning task. A process of training the deep neural network is a process of learning a weight matrix, and a final objective of training is to obtain weight matrices (weight matrices formed by vectors W at many layers) of all layers of a trained deep neural network.

7. Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(8) Back Propagation Algorithm

An error back propagation (BP) algorithm may be used in the neural network to correct a value of a parameter in an initial neural network model in a training process, to reduce a reconstruction error loss of the neural network model. An input signal is forward transmitted until an error loss is generated in an output, and the parameter of the initial neural network model is updated through back propagation of information about the error loss, to converge the error loss. The back propagation algorithm is a back propagation motion dominated by an error loss, and is intended to obtain a parameter of an optimal neural network model, for example, a weight matrix.

Figure 2:
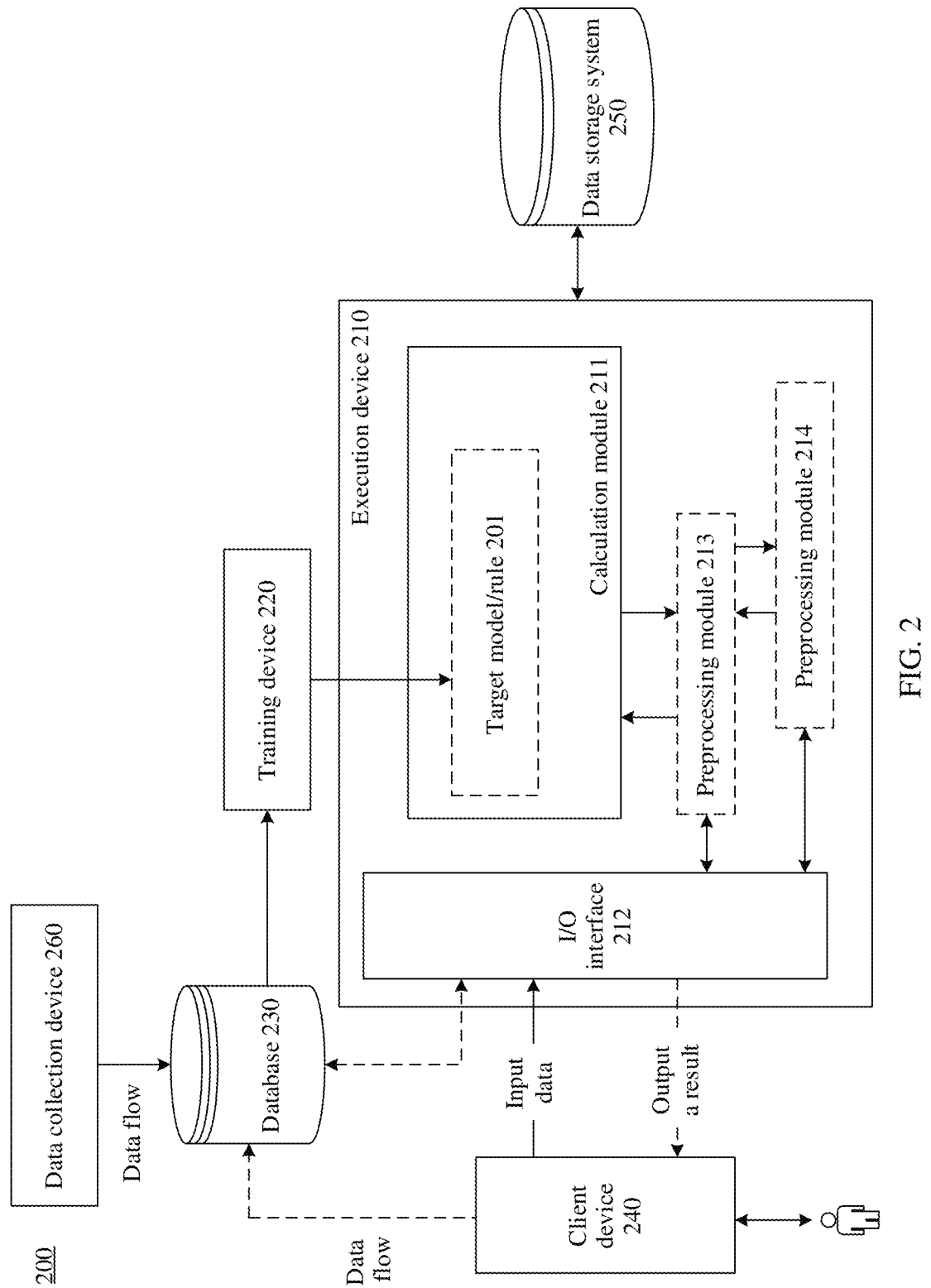
FIG. 2 is a schematic diagram of system architecture according to an embodiment of the present disclosure.

FIG. 2 shows system architecture 200 according to an embodiment of the present disclosure.

In FIG. 2, a data collection device 260 is configured to collect training data. For a method of training a search recommendation model in embodiments of the present disclosure, the search recommendation model may be further trained by using a training sample. In other words, the training data collected by the data collection device 260 may be the training sample.

For example, in this embodiment, a training sample set may include a sample user behavior group sequence and a masked sample user behavior group sequence. The sample user behavior group sequence includes a sample query field (for example, a first query field) and an object of a response operation of a sample user in search results corresponding to the sample query field. The masked sample user behavior group sequence is a sequence obtained after mask processing is performed on the object of the response operation of the sample user.

After collecting the training data, the data collection device 260 stores the training data in a database 230. A training device 220 obtains a target model/rule 201 through training based on the training data maintained in the database 230.

The following describes a process in which the training device 220 obtains the target model/rule 201 based on the training data. The training device 220 processes an input sample training set, and compares a truth with an output label of the object of the response operation of the sample user after the mask processing, until a difference between the truth and the label that is output by the training device 220 and that is of the object of the response operation of the sample user after the mask processing is less than a specific threshold, to complete training of the target model/rule 201.

For example, in this embodiment, the training device 220 may train the search recommendation model based on the training sample set. For example, the training sample set may be used as input data, and training may be performed on the search recommendation model, where a training target is to obtain the object of the response operation of the sample user after the mask processing. Further, the trained search recommendation model is obtained. In other words, the trained search recommendation model may be the target model/rule 201.

The target model/rule 201 can be used to predict a label of a candidate recommendation object in search results corresponding to a query field when the user inputs the query field. The target model/rule 201 in this embodiment may be a bidirectional encoder representations from transformers (BERT) model, or the like.

It should be noted that in actual application, the training data maintained in the database 230 is not necessarily all collected by the data collection device 260, and some training data may be received from another device.

In addition, it should be noted that the training device 220 may not train the target model/rule 201 entirely based on the training data maintained in the database 230, and may train a model through obtaining training data from a cloud or another place. The foregoing description should not be construed as a limitation to this embodiment.

The target model/rule 201 obtained by the training device 220 through training may be applied to different systems or devices, for example, applied to an execution device 210 shown in FIG. 2. The execution device 210 may be a terminal, for example, a mobile phone terminal, a tablet computer, a notebook computer, augmented reality (AR)/virtual reality (VR), or an in-vehicle terminal: or may be a server, a cloud server, or the like. In FIG. 2, the execution device 210 is configured with an input/output (I/O) interface 212 configured to exchange data with an external device. A user may input data to the I/O interface 212 by using a client device 240. The input data in this embodiment may include a training sample input by a client device.

A preprocessing module 213 and a preprocessing module 214 are configured to preprocess the input data received by the I/O interface 212. In this embodiment, there may be no preprocessing module 213 and preprocessing module 214 (or there may be only one preprocessing module), and a calculation module 211 is directly used to process the input data.

In a process in which the execution device 210 preprocesses the input data, or in a process in which a calculation module 211 of the execution device 210 performs calculation or the like, the execution device 210 may invoke data, code, and the like in a data storage system 250 for corresponding processing; and may also store, in a data storage system 250, data, instructions, and the like that are obtained through the corresponding processing.

Finally, an I/O interface 212 returns a processing result. For example, the obtained trained search recommendation model may be used in a search system for online inference of the label of the candidate recommendation object in the candidate recommendation object set corresponding to the current query field of the user, obtaining sorted search results corresponding to the current query field based on the label of the candidate recommendation object, and returning the sorted search results to the client device 240 and then to the user.

It should be noted that the training device 220 may generate, based on different training data, the corresponding target models/rules 201 for different targets or different tasks. The corresponding target models/rules 201 may be used to implement the foregoing targets or complete the foregoing tasks, thereby providing a desired result for the user.

In the case shown in FIG. 2, in a case, the user may manually give input data. The manually giving may be performed by using an interface provided by the I/O interface 212.

In another case, the client device 240 may automatically send the input data to the I/O interface 212. If it is required that the client device 240 needs to obtain a grant from the user for automatically sending the input data, the user may set corresponding permission in the client device 240. The user may view, on the client device 240, a result output by the execution device 210. A specific presentation form may be a specific manner such as display, voice, or an action. The client device 240 may also serve as a data collection end: collect, as new sample data, the input data that is input to the I/O interface 212 and an output result that is output from the I/O interface 212 shown in the figure; and store the new sample data in the database 230. Certainly, alternatively, the input data that is input to the I/O interface 212 and the output result that is output from the I/O interface 212 shown in the figure may be directly stored as new sample data in the database 130 by using the I/O interface 212, instead of being collected by the client device 240.

It should be noted that FIG. 2 is merely a schematic diagram of system architecture according to an embodiment of the present disclosure, and a location relationship between a device, a component, a module, and the like shown in the figure constitutes no limitation. For example, in FIG. 2, the data storage system 250 is an external memory relative to the execution device 210. In another case, the data storage system 250 may alternatively be disposed in the execution device 210.

For example, the search recommendation model in the present disclosure may be a bidirectional encoder representations from transformers (BERT) model, or an enhanced representation through knowledge integration (ERNIE) model, or another model.

Figure 3:
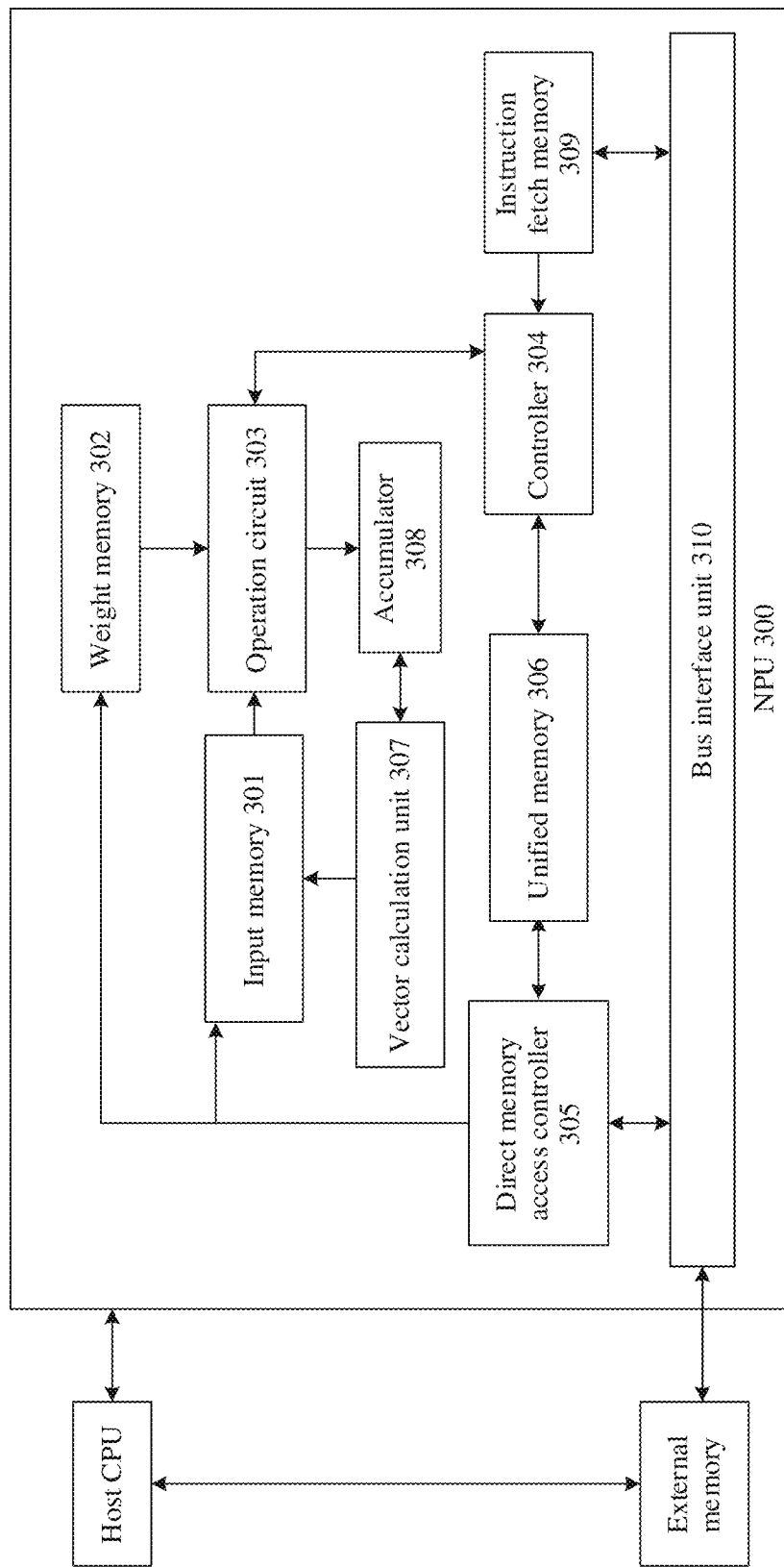
FIG. 3 is a schematic diagram of a hardware structure of a chip according to an embodiment of the present disclosure.

FIG. 3 is a schematic diagram of a hardware structure of a chip according to an embodiment of the present disclosure.

As shown in FIG. 3, the chip includes a neural network processing unit 300 (NPU). The chip may be disposed in the execution device 210 shown in FIG. 2, to complete calculation work of the calculation module 211. The chip may alternatively be disposed in the training device 220 shown in FIG. 2, to complete training work of the training device 220 and output the target model/rule 201.

The neural network processing unit 300 serves as a coprocessor mounted to a host central processing unit (CPU). The host CPU allocates a task. A core part of the NPU 300 is an operation circuit 303. A controller 304 controls the operation circuit 303 to extract data from a memory (a weight memory or an input memory) and perform an operation.

In some implementations, the operation circuit 303 includes a plurality of processing engine (process engine, PE).

In some implementations, the operation circuit 303 is a two-dimensional systolic array, or the operation circuit 303 may be a one-dimensional systolic array or another electronic circuit that can perform arithmetical operations such as multiplication and addition.

In some implementations, the operation circuit 303 is a general-purpose matrix processor.

For example, it is assumed that there are an input matrix A, a weight matrix B, and an output matrix C. The operation circuit 303 extracts data corresponding to the matrix B from a weight memory 302, and buffers the data on each PE in the operation circuit 303. The operation circuit 303 obtains data of the matrix A from an input memory 301, performs a matrix operation on the data of the matrix A and the matrix B, and stores some results or a final result of an obtained matrix in an accumulator 308. A vector calculation unit 307 may perform further processing such as vector multiplication, vector addition, an exponent operation, a logarithm operation, or value comparison on output of the operation circuit 303.

For example, the vector calculation unit 307 may be configured to perform network calculation, such as pooling, batch normalization, or local response normalization, at a non-convolution/non-FC layer in a neural network.

In some implementations, the vector calculation unit 307 can store, in a unified memory 306, an output vector that has been processed. For example, the vector calculation unit 307 may apply a non-linear function to the output of the operation circuit 303, for example, to a vector of an accumulated value, to generate an activation value.

In some implementations, the vector calculation unit 307 generates a normalized value, a combined value, or both.

In some implementations, the output vector that has been processed can be used as activation input of the operation circuit 303, for example, to be used in a subsequent layer in the neural network.

For example, the unified memory 306 may be configured to store input data and output data. For weight data, a direct memory access controller 305 (DMAC) stores input data in an external memory to the input memory 301 and/or the unified memory 306, store weight data in the external memory to the weight memory 302, and store data in the unified memory 306 to the external memory.

For example, a bus interface unit (BIU) 310 may be configured to implement interaction between the host CPU, the DMAC, and an instruction fetch memory 309 by using a bus.

For example, the instruction fetch memory (instruction fetch buffer) 309 connected to the controller 304 may be configured to store instructions used by the controller 304. The controller 304 may be configured to invoke the instructions buffered in the instruction fetch memory 309, to implement a working process of controlling an operation accelerator.

Generally, the unified memory 306, the input memory 301, the weight memory 302, and the instruction fetch memory 309 each may be an on-chip memory. The external memory is a memory outside the NPU. The external memory may be a double data rate synchronous dynamic random access memory (DDR SDRAM), a high bandwidth memory (HBM), or another readable and writable memory.

It should be noted that an operation in the search recommendation model in this embodiment may be performed by the operation circuit 303 or the vector calculation unit 307.

Currently, in a search recommendation system, search results may be generated through sorting objects in a candidate set by using a sorting function of learning associations between objects in a search word-candidate set. However, only static information of the current search, that is, information of a search word is considered in the foregoing sorting function. Different users obtain the same sorted search results when inputting the same search word. In other words, accuracy of the search results obtained based on the current search recommendation model is relatively low; and requirements of different users cannot be met; and therefore, user experience is relatively poor.

In view of this, in a process of training the search recommendation model, data that includes a query field of the user and a response operation of the user is used, so that the search recommendation model can learn, based on historical behavior logs of different users, an association relationship between the query field and the response operation of the user. In other words, the search recommendation model in the present disclosure can be effectively trained by using historical behavior data of the user, so that the trained search recommendation model can predict a label of a candidate recommendation object in search results corresponding to a query field when the user inputs the query field. A search intention of the user can be recognized based on the label of the candidate recommendation object, to improve accuracy of feedback search results, that is, improve accuracy of the search recommendation model.

Figure 4:
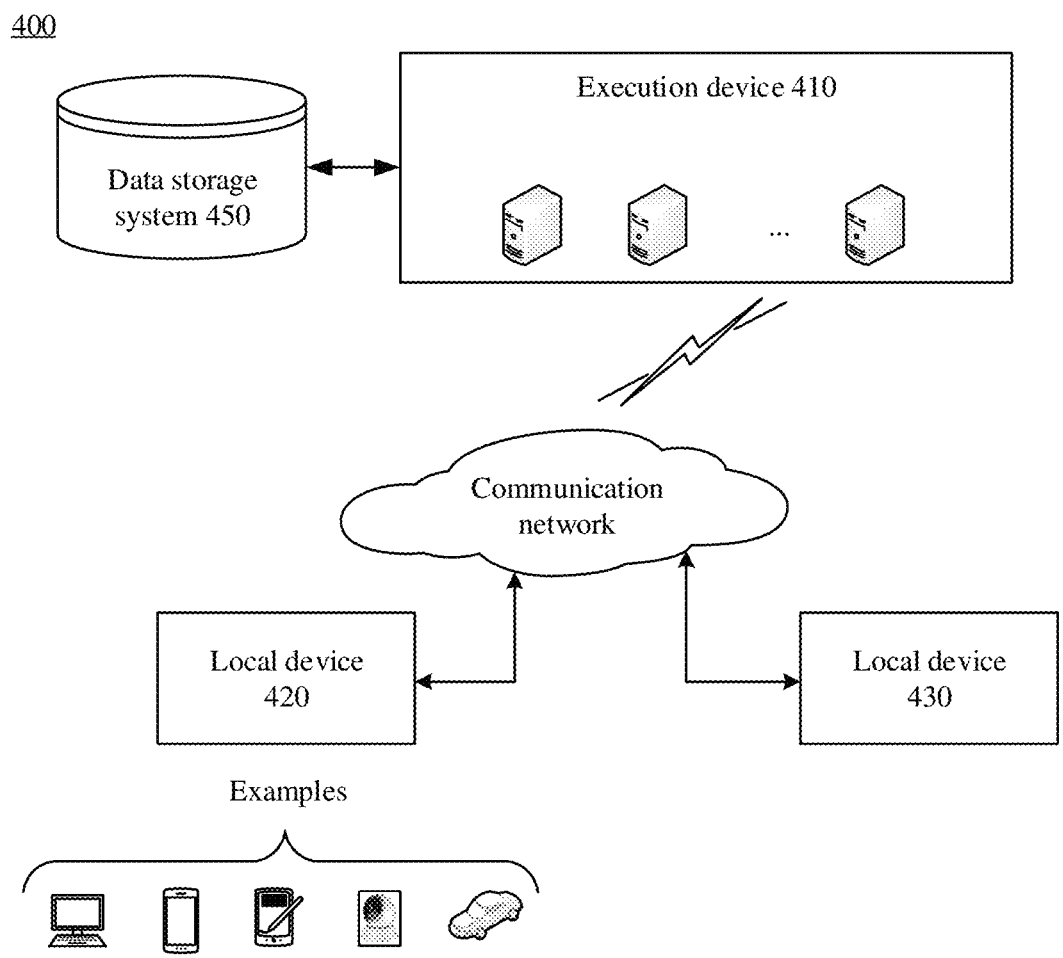
FIG. 4 shows system architecture using a method for training a search recommendation model and a method for sorting search results according to an embodiment of the present disclosure.

FIG. 4 shows system architecture using a method for training a search recommendation model and a method for sorting search results according to an embodiment of the present disclosure. The system architecture 400 may include a local device 420, a local device 430, an execution device 410, and a data storage system 450. The local device 420 and the local device 430 may be connected to the execution device 410 by using a communication network.

The execution device 410 may be implemented by one or more servers. Optionally, the execution device 410 may be used in cooperation with another computing device, for example, a device such as a data memory, a router, or a load balancer. The execution device 410 may be disposed on one physical station or distributed on a plurality of physical stations. The execution device 410 may use data in the data storage system 450, or invoke program code in the data storage system 450 to implement the method for training a search recommendation model and the method for sorting search results in embodiments of the present disclosure.

For example, the data storage system 450 may be deployed in the local device 420 or the local device 430. For example, the data storage system 450 may be configured to store a behavior log of a user.

It should be noted that the execution device 410 may also be referred to as a cloud device. In this case, the execution device 410 may be deployed in a cloud.

The execution device 410 may perform the following processes: obtaining a training sample set, where the training sample set includes a sample user behavior group sequence and a masked sample user behavior group sequence, the sample user behavior group sequence includes a first query field and an object of a response operation of a sample user in search results corresponding to the first query field, and the masked sample user behavior group sequence includes a second query field and a sequence obtained after mask processing is performed on an object of a response operation of the sample user in search results corresponding to the second query field; and using the training sample set as input data, and training the search recommendation model, to obtain the trained search recommendation model, where a training target is to obtain the object of the response operation of the sample user after the mask processing, the search recommendation model is used to predict a label of a candidate recommendation object in search results corresponding to a query field when a target user inputs the query field, and the label is used to indicate a probability that the target user performs a response operation on the candidate recommendation object.

In the foregoing processes, the execution device 410 can obtain the pre-trained search recommendation model through training. The search recommendation model can be effectively trained based on historical behavior data of the user, so that the trained search recommendation model can predict the label of the candidate recommendation object in the search results corresponding to the query field based on a hobby of the user when the user inputs the query field.

In a possible implementation, the training method performed by the execution device 410 may be an offline training method performed in the cloud.

For example, the user may store an operation log to the data storage system 450 after operating respective user equipment (for example, the local device 420 and the local device 430). The execution device 410 may invoke the data in the data storage system 450 to complete the process of training the search recommendation model. Each local device may represent any computing device, for example, a personal computer, a computer work station, a smartphone, a tablet computer, a smart camera, a smart car, another type of cellular phone, a media consumption device, a wearable device, a set top box, or a game machine. A local device of each user may interact with the execution device 410 by using a communication network of any communication mechanism/communication standard. The communication network may use a manner of a wide area network, a local area network, a point-to-point connection, or any combination thereof.

In an implementation, the local device 420 and the local device 430 may obtain related parameters of the pre-trained search recommendation model from the execution device 410, and use the search recommendation model. The label of the candidate recommendation object in the search results corresponding to the query field is predicted by using the search recommendation model when the user inputs the query field. The label may indicate whether the user performs the response operation on the candidate recommendation object, for example, whether the user clicks the candidate recommendation object.

In another implementation, the pre-trained search recommendation model may be directly deployed on the execution device 410. The execution device 410 obtains the to-be-processed user behavior group sequence from the local device 420 and the local device 430, and obtains, by using the pre-trained search recommendation model, the label of the candidate recommendation object in the candidate recommendation object set corresponding to the current query field.

For example, the data storage system 450 may be deployed in the local device 420 or the local device 430, and configured to store a behavior log of the user of the local device.

For example, the data storage system 450 may be independent of the local device 420 or the local device 430, and is independently deployed on a storage device. The storage device may interact with the local device, obtain the behavior log of the user in the local device, and store the behavior log in the storage device.

The following describes embodiments of the present disclosure in detail with reference to FIG. 5 to FIG. 11.

FIG. 5 is a schematic flowchart of a method for training a search recommendation model according to an embodiment of the present disclosure. The training method 500 shown in FIG. 5 includes step 510 and step 520. The following separately describes step 510 and step 520 in detail.

Step 510: Obtain a training sample set.

The training sample set may include a sample user behavior group sequence and a masked sample user behavior group sequence. The sample user behavior group sequence may include a first query field and an object of a response operation of a sample user in search results corresponding to the first query field. The masked sample user behavior group sequence is a sequence obtained after mask processing is performed on the object of the response operation of the sample user. For example, the masked sample user behavior group sequence may include a second query field and a sequence obtained after mask processing is performed on an object of a response operation of the sample user in search results corresponding to the second query field.

It should be understood that the foregoing sample user behavior group sequence may be a group of data that is of the sample user and that is sorted in a time sequence, for example, behavior log data of the sample user.

For example, the training sample set may be data obtained from the data storage system 450 shown in the figure.

For example, as shown in FIG. 1, the training sample set may be data obtained from a user behavior log of the sample user, and includes a historical query field of the sample user and a response operation of the sample user to a candidate recommendation object in search results corresponding to the historical query field, for example, operations performed by the sample user on a candidate recommendation object in search results corresponding to a search field such as a click operation, a download operation, a purchase operation, and a browse operation. It should be understood that the sample user behavior group sequence may include the first query field and the object of the response operation of the sample user in the search results corresponding to the first query field. There is an association relationship between the first query field and the object of the response operation of the sample user in the search results. For example, when the sample user inputs a query field, the sample user obtains search results corresponding to the sample field. The search results may include a plurality of candidate recommendation objects associated with the query field. Further, the sample user may perform a response operation on the candidate recommendation object included in the search results based on a hobby and a requirement of the sample user, for example, click, download, purchase, or browse some or all of candidate objects in the search results, to generate data of the response operation of the sample user and store the data in the behavior log of the sample user. For example, the object of the response operation of the user may be a document, a service product, an advertisement, an application, or the like. The response operation of the user includes one or more of a click operation, a download operation, a purchase operation, or a browse operation of the user.

Further, in this embodiment, in order that the association relationship between a query field and a response behavior of the user can be learned in the process of training the search recommendation model, that is, the query field and the response operation performed by the user on the candidate recommendation object in the search results corresponding to the query field can be learned, relatively independent query field data in the user behavior log may be bound to user response field data, to obtain training sample data, that is, a user behavior group sequence.

Optionally, in a possible implementation, the obtaining a training sample set includes: obtaining the first query field and data of the object of the response operation of the sample user; and performing binding processing on the first query field and the object of the response operation of the sample user corresponding to the first query field, to obtain the sample user behavior group sequence.

For example, the sample user behavior group sequence further includes identification information. The identification information is used to indicate an association relationship between the first query field and the object of the response operation of the sample user. The identification information includes a time identifier.

Figure 7:
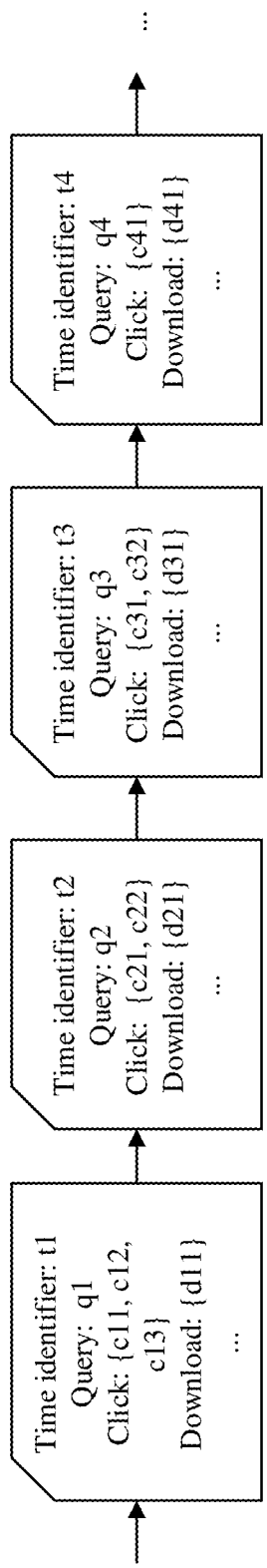
FIG. 7 is a schematic diagram of a user behavior group sequence according to an embodiment of the present disclosure.

For example, as shown in FIG. 7, the sample user behavior group sequence may be a sequence including four training samples. Each training sample may include a time identifier, a query field, and an object of a response operation of the user (for example, a clicked object and a downloaded object). A function of the time identifier may be an identifier of binding a query field to an object of a response operation of the user corresponding to the query field.

For example, the masked sample user behavior group sequence may indicate that mask processing is performed on an obtained original user behavior group sequence. For example, a specific proportion of user behavior group sequences may be randomly sampled from original user behavior group sequences. For the sampled user behavior group sequence, an operation object of a response behavior of the user is masked. A specific mask manner may be replacing an original object with a special 'MASK' symbol.

Figure 8:
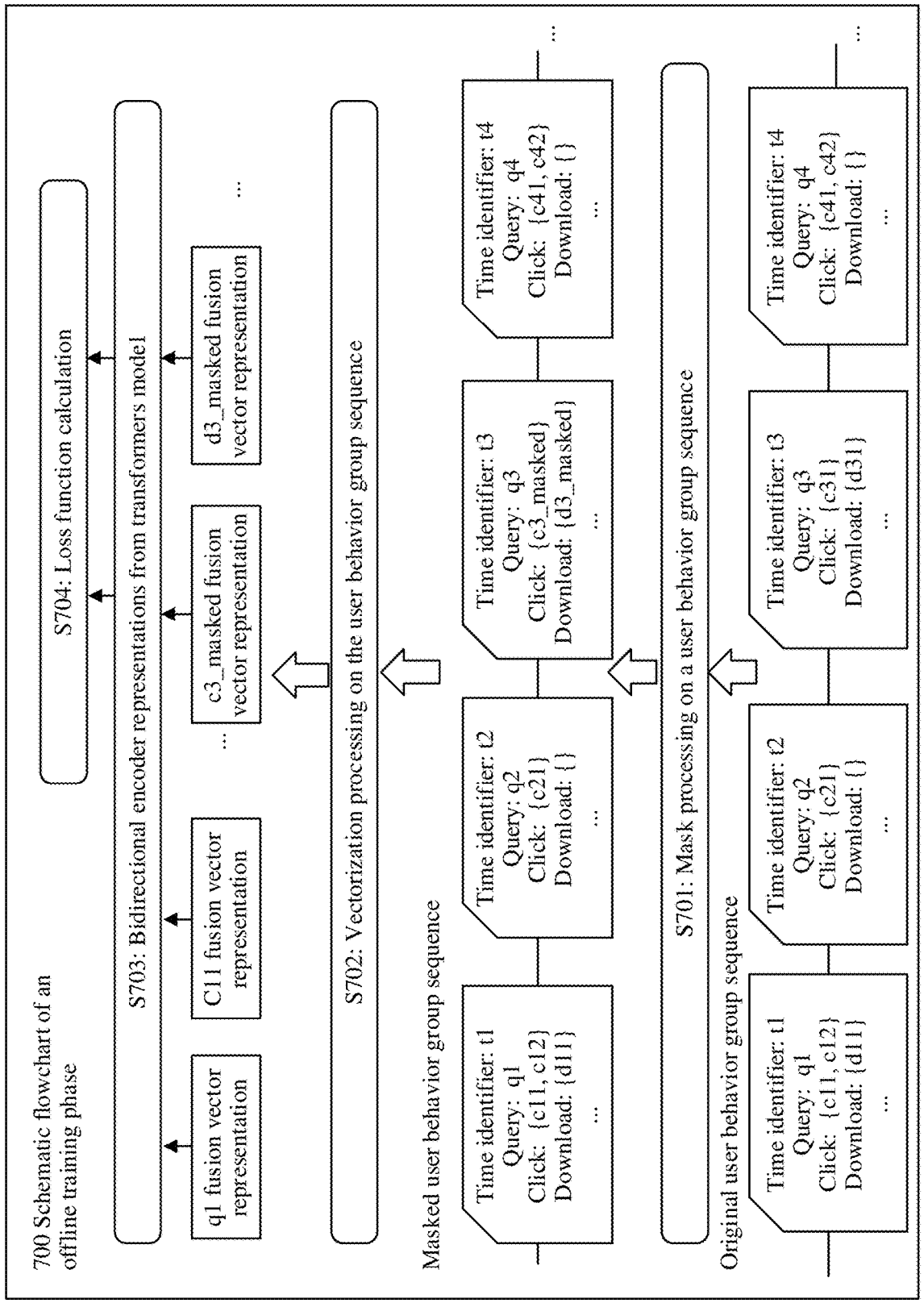
FIG. 8 is a schematic diagram of offline training of a search recommendation model according to an embodiment of the present disclosure.

For example, as shown in FIG. 8, a clicked object c3 and a downloaded object d3 in a user behavior group sequence with a time identifier t3 are masked to generate a corresponding masked user behavior group sequence.

Step 520: Use the training sample set as input data, and train a search recommendation model, to obtain the trained search recommendation model, where a training target is to obtain the object of the response operation of the sample user after the mask processing.

The search recommendation model is used to predict a label of a candidate recommendation object in search results corresponding to a query field when a target user inputs the query field. The label may be used to indicate whether the target user performs a response operation on the candidate recommendation object.

For example, the label of the candidate recommendation object may be an evaluation score of the candidate recommendation object corresponding to the query field. A candidate recommendation object with a higher evaluation score may indicate a higher probability that the user performs a response operation on the candidate recommendation object based on historical behavior data of the user. In this case, the candidate recommendation object may be placed at a front location in the search results.

Optionally, in a possible implementation, the search recommendation model predicts the label of the candidate recommendation object based on the query field input by the target user and the historical behavior group sequence of the target user. The historical behavior group sequence of the target user is obtained based on the historical query field of the target user and the historical behavior data corresponding to the historical query field. The historical behavior data corresponding to the historical query field is an object of a response operation performed by the target user on the search results corresponding to the historical query field.

In this embodiment, the search recommendation model can be effectively trained by using the historical behavior data of the user, so that the trained search recommendation model can predict the label of the candidate recommendation object in the search results corresponding to the query field when the user inputs the query field. A search intention of the user can be recognized based on the label of the candidate recommendation object, to improve sorting accuracy of the search results.

For example, in this embodiment, the search recommendation model may be the bidirectional encoder representations from transformers (BERT) model. Further, in order that the search recommendation model can recognize a format of the training sample set, vectorization processing may be performed on data in the training sample set, that is, a multi-element group sequence may be converted into a vector sequence.

Optionally, in a possible implementation, the search recommendation model may be a bidirectional encoder representations from transformers (BERT) model. The training method further includes: performing vectorization processing on the sample user behavior group sequence and the masked sample user behavior group sequence included in the training sample set, to obtain a vector sequence. The using the training sample set as input data includes: inputting the vector sequence to the BERT model.

For example, the query field in the user behavior group sequence and the object of the response operation may be converted into a dense vector. A query object is the query field, and the object of the response operation is a search result selected by the user. In the foregoing vectorization processing process, a vector of an object needs to be added to a corresponding behavior group vector and a behavior type vector, to fully express the current user behavior group sequence.

For example, description is provided by using an example in which the user behavior group sequence is g1{time stamp:t1, query:q1, click:{c11,c12}, download:{d11}}. The user behavior group sequence after format processing may be as follows:

$$\text{Vector}(q1)=\text{word2vect}(q1)+\text{group\_embedding}(t1)+\text{action\_embedding}(\text{query})$$

$$\text{Vector}(c11)=\text{item\_embedding}(c11)+\text{group\_embedding}(t1)+\text{action\_embedding}(\text{click})$$

$$\text{Vector}(d11)=\text{item\_embedding}(d11)+\text{group\_embedding}(t1)+\text{action\_embedding}(\text{download})$$

Herein, word2vec( ) indicates a word vector conversion function, group_embedding( ) indicates a group embedding vector composition function, action_embedding( ) indicates a behavior embedding vector composition function, and item_embedding ( ) indicates an item embedding vector composition function.

In this embodiment, in the process of training the search recommendation model, data that includes the query field of the user and the response operation of the user may be used, so that the search recommendation model can learn, based on historical behavior logs of different users, an association relationship between the query field and the response operation of the user. In other words, the search recommendation model in the present disclosure can be effectively trained by using the historical behavior data of the user, so that the trained search recommendation model can predict a label of a candidate recommendation object in search results corresponding to a query field when the user inputs the query field. A search intention of the user can be recognized based on the label of the candidate recommendation object, to improve accuracy of feedback search results, that is, improve accuracy of the search recommendation model.

Figure 6:
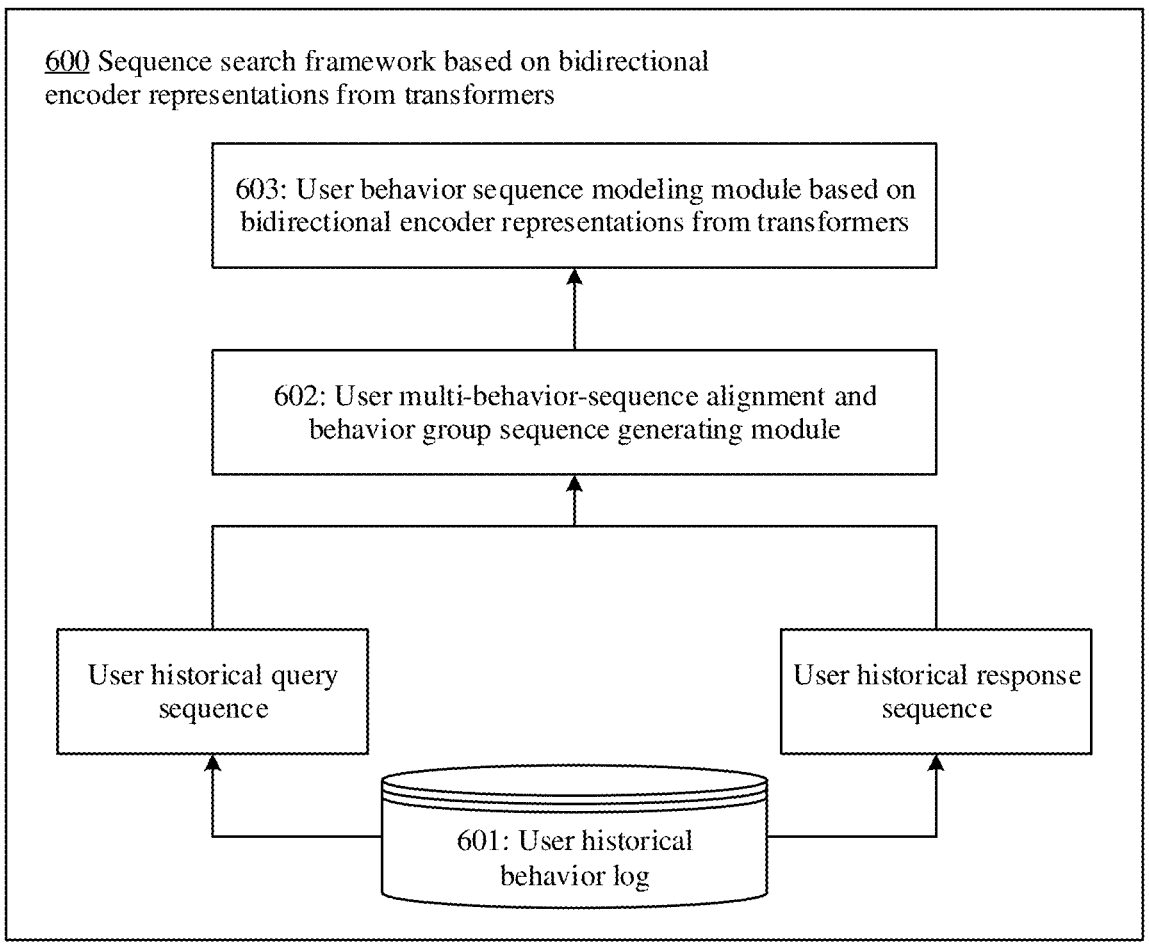
FIG. 6 is a schematic diagram of sequence search architecture based on bidirectional encoder representations from transformers according to an embodiment of the present disclosure.

FIG. 6 is a schematic diagram of sequence search architecture based on bidirectional encoder representations from transformers according to an embodiment of the present disclosure.

As shown in FIG. 6, the sequence search architecture 600 includes a user historical behavior log 601, a user multi-behavior-sequence alignment and behavior group sequence generating module 602, and a user behavior sequence modeling module 603 based on bidirectional encoder representations from transformers. The sequence search architecture can more accurately capture a hobby of a user through jointly modeling a user historical query sequence and a user response sequence to a query result, to output search results more consistent with an individual preference of the user in the future.

For example, the user historical query sequence and a user historical response sequence may be obtained from the user historical behavior log 601. The user historical query sequence is a sequence formed through sorting query fields input by the user in a search box in a time sequence. The user historical response sequence is a sequence formed through sorting response behavior of the user for search results displayed on a platform in a time sequence. For example, the response behavior of the user may include but are not limited to an action that reflects a tendency of a hobby of the user, such as click, download, or purchase.

The user multi-behavior-sequence alignment and behavior group sequence generating module 602 is configured to: perform alignment processing on the user historical query sequence and the user historical response sequence, and output a user behavior group sequence after the alignment. The alignment processing is to obtain an association relationship between the user historical query sequence and the user historical response sequence that are obtained from the user historical behavior log 601.

It should be understood that the user historical query sequence or the user historical response sequence that is included in the user historical behavior log 601 may be relatively independent data. However, the user historical response sequence is a user response corresponding to a search result fed back after the user inputs a specific query word. Therefore, there is the association relationship between the user historical query sequence and the user historical response sequence. The foregoing alignment processing may be used to obtain the association relationship between the user historical query sequence and the user historical response sequence in data of the user behavior log.

For example, if a user historical query sequence A is obtained from the user historical behavior log 601, performing alignment between the user historical query sequence and the user historical response sequence indicates obtaining a user historical response sequence A corresponding to the user historical query sequence A. In other words, the user historical response sequence A indicates a response behavior of the user to a search result that corresponds to a query field A and that is displayed on the platform after the user inputs the query field A in the search box.

For example, FIG. 7 is a schematic diagram of a user behavior group sequence according to an embodiment of the present disclosure. As shown in FIG. 7, each user behavior group sequence may be obtained after alignment processing is performed on the user historical query sequence and the user historical response sequence. Each element of the user behavior group sequence may be one N-tuple. The N-tuple may describe one complete search behavior of the user, for example, a query field used by the user and a response of the user to a corresponding search result. For example, the response of the user may include click, download, browse, or purchase. An operation object of the response behavior shown in FIG. 7 may be a document, a service product, an advertisement, an application, or the like.

In this embodiment, as shown in FIG. 7, a user query sequence may be bound to a user response sequence by using a time stamp, to generate one piece of training sample data.

The user behavior sequence modeling module 603 based on the bidirectional encoder representations from transformers is configured to: receive output of the user multi-behavior-sequence alignment and behavior group sequence generating module 602, and model the user behavior group sequence based on the bidirectional encoder representations from transformers, to obtain a search recommendation model. In other words, when the user inputs a query word, search results can be obtained by using the search recommendation model based on the preference of the user. In this case, in the search results, based on historical behavior of the user, a recommended object in which the user may be interested and to which the user may respond (for example, click) may be placed at a front location in the search results, and a recommended object in which the user may not be interested may be placed at a back location of the search results.

Figure 9:
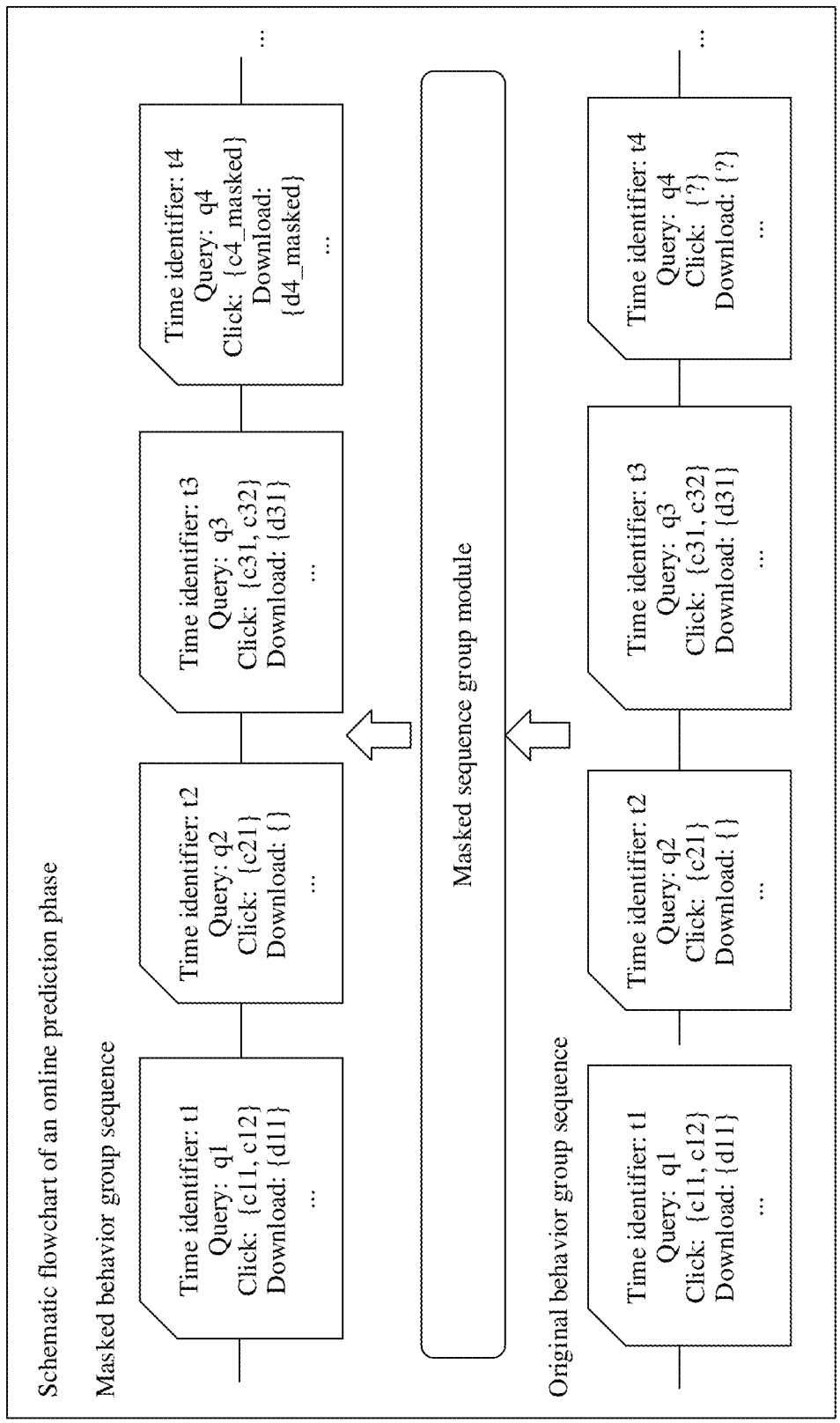
FIG. 9 is a schematic flowchart of a method for sorting search results according to an embodiment of the present disclosure.

The following describes in detail a procedure of offline training and online inference of the search recommendation model with reference to FIG. 8 and FIG. 9.

Offline Training Phase

FIG. 8 is a schematic flowchart of offline training of a search recommendation model according to an embodiment of the present disclosure. The training method 700 shown in FIG. 8 includes step S701 to step S704. The following separately describes step S701 to step S704 in detail.

It should be noted that the offline training process of the search recommendation model shown in FIG. 8 may be performed by the user behavior sequence modeling module 603 based on bidirectional encoder representations from transformers shown in FIG. 7.

S701: Perform mask processing on a user behavior group sequence.

For example, mask processing may be performed on an obtained original user behavior group sequence. For example, a specific proportion of user behavior group sequences may be randomly sampled from original user behavior group sequences. For the sampled user behavior group sequence, an operation object of a response behavior of the user is masked. A specific mask manner may be replacing an original object with a special 'MASK' symbol.

It should be understood that a training target of the search recommendation model is to recover the masked original object in the user behavior group sequence.

The original user behavior group sequence may be a user behavior group sequence obtained based on a user query sequence and a user historical response sequence. In other words, the user behavior group sequence shown in FIG. 7 may be used. Alternatively, the original user behavior group sequence may be a user behavior group sequence output by the user multi-behavior-sequence alignment and behavior group sequence generating module 602 shown in FIG. 6.

For example, as shown in FIG. 8, after mask processing is performed on the original user behavior group sequence, a user behavior response corresponding to a time identifier t3 may be masked.

S702: Perform vectorization processing on the user behavior group sequence.

The vectorization processing performed on the user behavior group sequence indicates performing format processing on the user behavior group sequence after the mask processing, and converting the user behavior group sequence to a format that can be processed by a bidirectional encoder representations from transformers (BERT) model.

For example, a query behavior in the user behavior group sequence and an operation object in a response behavior sequence may be converted into a dense vector. An operation object of a query behavior is the query field, and an operation object of a response behavior is a search result selected by the user. In the foregoing vectorization process, a vector of an operation object needs to be added to a corresponding behavior group vector and a behavior type vector, to fully express the current user behavior group sequence.

For example, description is provided by using an example in which the user behavior group sequence is g1{time stamp:t1, query:q1, click:{c11,c12}, download:{d11}}. The user behavior group sequence after format processing may be as follows:

Vector($q1$)=word2vect($q1$)+group_embedding($t1$)+
action_embedding(query)

Vector($c11$)=item_embedding($c11$)+group_embedding($t1$)+action_embedding(click)

Vector($d11$)=item_embedding($d11$)+group_embedding($t1$)+action_embedding(download)

Herein, word2vec( ) indicates a word vector conversion function, group_embedding( ) indicates a group embedding vector composition function, action_embedding( ) indicates a behavior embedding vector composition function, and item_embedding ( ) indicates an item embedding vector composition function.

The format processing performed on the user behavior group sequence may be converting the user behavior group sequence g1 into four vectors: Vector (q1), Vector (c11), Vector (c12), and Vector (d11).

S703: Train the search recommendation model. For example, the search recommendation model may be a bidirectional encoder representations from transformers model.

For example, the vector that is obtained after the mask processing and that is output in step S702 is training data, so that the search recommendation model learns association relationships between different user behavior group sequence points and updates a vector representation of each sequence group. A training target of the search recommendation model is to recover the masked original object in the user behavior group sequence.

For example, a vector sequence obtained after the vectorization processing is performed on the user behavior group sequence is input to the search recommendation model. The search recommendation model may generate a random vector for a vector at a mask location in the training process, and continuously perform back update on model parameters of the search recommendation model based on a difference between a truth label and a label of the object at the mask location, that is, continuously update an input vector sequence. Because an interaction is implemented between the vector at the mask location and a vector at another location, the input vector sequence is continuously updated in the training process. The training target is to make the label that is of the vector at the mask location and that is output by the search recommendation model, be continuously close to the truth label at the location. After the search recommendation model is trained, information of a historical behavior group sequence of the user is stored in these vectors.

S704: Calculate a loss function of the search recommendation model.

For example, a loss value for self-recovery of the object at the mask location is calculated, to determine that iterative training is performed on the search recommendation model. Model parameters of the search recommendation model may be trained based on the loss value.

For example, a vector representation that corresponds to the object in the mask location and that is output by the model may be obtained. The training target is to continuously update model parameters of a search recommendation model, to maximize an inner product of a vector representation at the mask location and an embedding vector of an actual corresponding operation object and minimize an inner product of the vector representation and an embedding vector of another object, so that the training process is completed for the search training model.

In this embodiment, in the process of training the search recommendation model, data that includes the query field of the user and the response operation of the user may be used, so that the search recommendation model can learn, based on historical behavior logs of different users, an association relationship between the query field and the response operation of the user. In other words, the search recommendation model in the present disclosure can be effectively trained by using historical behavior data of the user, so that the trained search recommendation model can predict a label of a candidate recommendation object in search results corresponding to a query field when the user inputs the query field. A search intention of the user can be recognized based on the label of the candidate recommendation object, to improve accuracy of feedback search results, that is, improve accuracy of the search recommendation model.

Online Inference Phase:

FIG. 9 is a schematic diagram of online inference of a search recommendation model according to an embodiment of the present disclosure.

As shown in FIG. 9, a query field currently input by a user is obtained. A to-be-predicted operation object of a user behavior is replaced with a 'MASK' symbol, to generate input data obtained after mask processing. Format processing is performed on the input data to obtain an input vector representation. An operation of obtaining an inner product is performed on an input vector and an embedding vector of a candidate set object, to obtain a final search result, that is, sorted search results.

Figure 10:
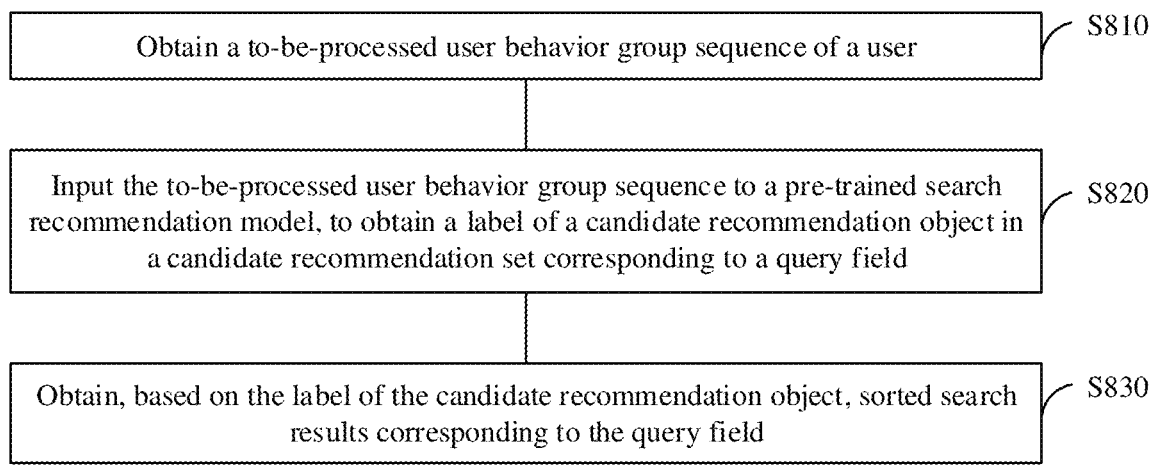
FIG. 10 is a schematic diagram of online inference of a search recommendation model according to an embodiment of the present disclosure.

FIG. 10 is a schematic flowchart of a method for sorting search results according to an embodiment of the present disclosure.

The method 800 shown in FIG. 10 includes step S810 to step S830. The following describes step S810 to step S830 in detail.

S810: Obtain a to-be-processed user behavior group sequence of a user.

The to-be-processed user behavior group sequence includes a current query field of the user and a sequence obtained after mask processing is performed on an object of a response operation of the user.

For example, as shown in FIG. 9, when the user inputs the current query field, that is, a latest query field, a recommended object to be responded to by the user in search results corresponding to the current query field is not known. Therefore, the object of the response operation of the user may be replaced with a 'MASK' symbol, to generate the to-be-processed user behavior group sequence.

S820: Input the to-be-processed behavior group sequence to a pre-trained search recommendation model, to obtain a label of a candidate recommendation object in a candidate recommendation object set corresponding to the current query field.

The label may be used to indicate a probability that the user performs a response operation on the candidate recommendation object in the candidate recommendation object set.

S830: Obtain, based on the label of the candidate recommendation object, sorted search results corresponding to the current query field.

The search recommendation model is used to predict a label of a candidate recommendation object in search results corresponding to a query field when a target user inputs the query field. The search recommendation model is obtained through using a training sample set as input data and performing training with a training target of obtaining an object of a response operation of a sample user after mask processing. The training sample set includes a sample user behavior group sequence and a masked sample user behavior group sequence. The sample user behavior group sequence includes a first query field and an object of a response operation of a sample user in search results corresponding to the first query field. The masked sample user behavior group sequence includes a second query field and a sequence obtained after mask processing is performed on an object of a response operation of the sample user in search results corresponding to the second query field.

For example, the candidate recommendation object may be a document, a service product, an advertisement, or an application.

For example, the response operation of the user includes one or more of a click operation, a download operation, a purchase operation, or a browse operation performed by the user on a candidate recommendation object.

It should be noted that the trained search recommendation model is obtained through pre-training the search model by using the training method shown in FIG. 5 or FIG. 8. When the user inputs the current query field, that is, when the user inputs the latest query field, the obtained to-be-processed user behavior group sequence may be input to the pre-trained search recommendation model. The pre-trained search recommendation model may output a label of a recommended object in a candidate recommendation set corresponding to the current field for the user. Whether the user performs a response operation on the candidate recommendation object in the candidate recommendation set may be predicted based on the label of the candidate recommendation object. For example, whether the user clicks the candidate recommendation object may be predicted. Further, candidate recommendation objects in the candidate recommendation set may be sorted based on labels of the candidate recommendation objects to obtain sorted search results.

For example, the label of the candidate recommendation object may be an evaluation score of the candidate recommendation object corresponding to the query field. A candidate recommendation object with a higher evaluation score may indicate a higher probability that the user performs a response operation on the candidate recommendation object based on historical behavior data of the user. In this case, the candidate recommendation object may be placed at a front location in search results.

It should be noted that the sample user behavior group sequence may include the first query field and the object of the response operation of the sample user in the search results corresponding to the first query field. There is an association relationship between the first query field and the object of the response operation of the sample user in the search results. For example, when the sample user inputs a query field, the sample user obtains search results corresponding to the sample field. The search results may include a plurality of candidate recommendation objects associated with the query field. Further, the sample user may perform a response operation on the candidate recommendation object included in the search results based on a hobby and a requirement of the sample user, for example, click, download, purchase, or browse some or all of the candidate objects in the search results, to generate data of the response operation of the sample user and store the data in the behavior log of the sample user. In this embodiment, in order that the association relationship between the query field and the response behavior of the user can be learned in the process of training the search recommendation model, that is, the query field and the response operation performed by the user on the candidate recommendation object in the search results corresponding to the query field can be learned, relatively independent query field data in the user behavior log may be bound to user response field data, to obtain training sample data, that is, a user behavior group sequence.

Optionally, in a possible implementation, the sample user behavior group sequence further includes identification information. The identification information is used to indicate an association relationship between the first query field and the object of the response operation of the sample user. The identification information includes a time identifier.

For example, as shown in FIG. 7, the sample user behavior group sequence may be a sequence including four training samples. Each training sample may include a time identifier, a query field, and a response operation of the user (for example, click and download). A function of the time identifier may be an identifier of binding a query field to a response operation of the user corresponding to the query field.

Optionally, in a possible implementation, the search recommendation model predicts the label of the candidate recommendation object based on the query field input by the target user and the historical behavior group sequence of the target user. The historical behavior group sequence of the target user is obtained based on the historical query field of the target user and the historical behavior data corresponding to the historical query field. The historical behavior data corresponding to the historical query field is an object of a response operation performed by the target user on the search results corresponding to the historical query field.

In this embodiment, the search recommendation model can be effectively trained by using the historical behavior data of the user, so that the trained search recommendation model can predict the label of the candidate recommendation object in the search results corresponding to the query field when the user inputs the query field. A search intention of the user can be recognized based on the label of the candidate recommendation object, to improve sorting accuracy of the search results.

Optionally, in a possible implementation, the pre-trained search recommendation model is a bidirectional encoder representations from transformers (BERT) model. The training sample set is obtained through performing vector processing on the sample user behavior group sequence and the masked sample user behavior group sequence.

In this embodiment, the search recommendation model may be the bidirectional encoder representations from transformers (BERT) model. Further, in order that the search recommendation model can recognize a format of the training sample set, vector processing may be performed on data in the training sample set, that is, a multi-element group sequence may be converted into a vector sequence.

In this embodiment, the label of the candidate recommendation object in the candidate recommendation object set corresponding to the current query field may be obtained by using the pre-trained search recommendation model. The label may be used to indicate a probability that the user performs the response operation on the candidate recommendation object in the candidate recommendation object set. The sorted search results corresponding to the current query field are obtained based on the label of the candidate recommendation object. In a process of training the search recommendation model, data that includes the query field of the user and the response operation of the user may be used, so that the search recommendation model can learn, based on historical behavior logs of different users, an association relationship between the query field and the response operation of the user. In other words, the search recommendation model in the present disclosure can be effectively trained by using historical behavior data of the user, so that the trained search recommendation model can predict a label of a candidate recommendation object in search results corresponding to a query field when the user inputs the query field. A search intention of the user can be recognized based on the label of the candidate recommendation object, to improve sorting accuracy of the search results.

Figure 11:
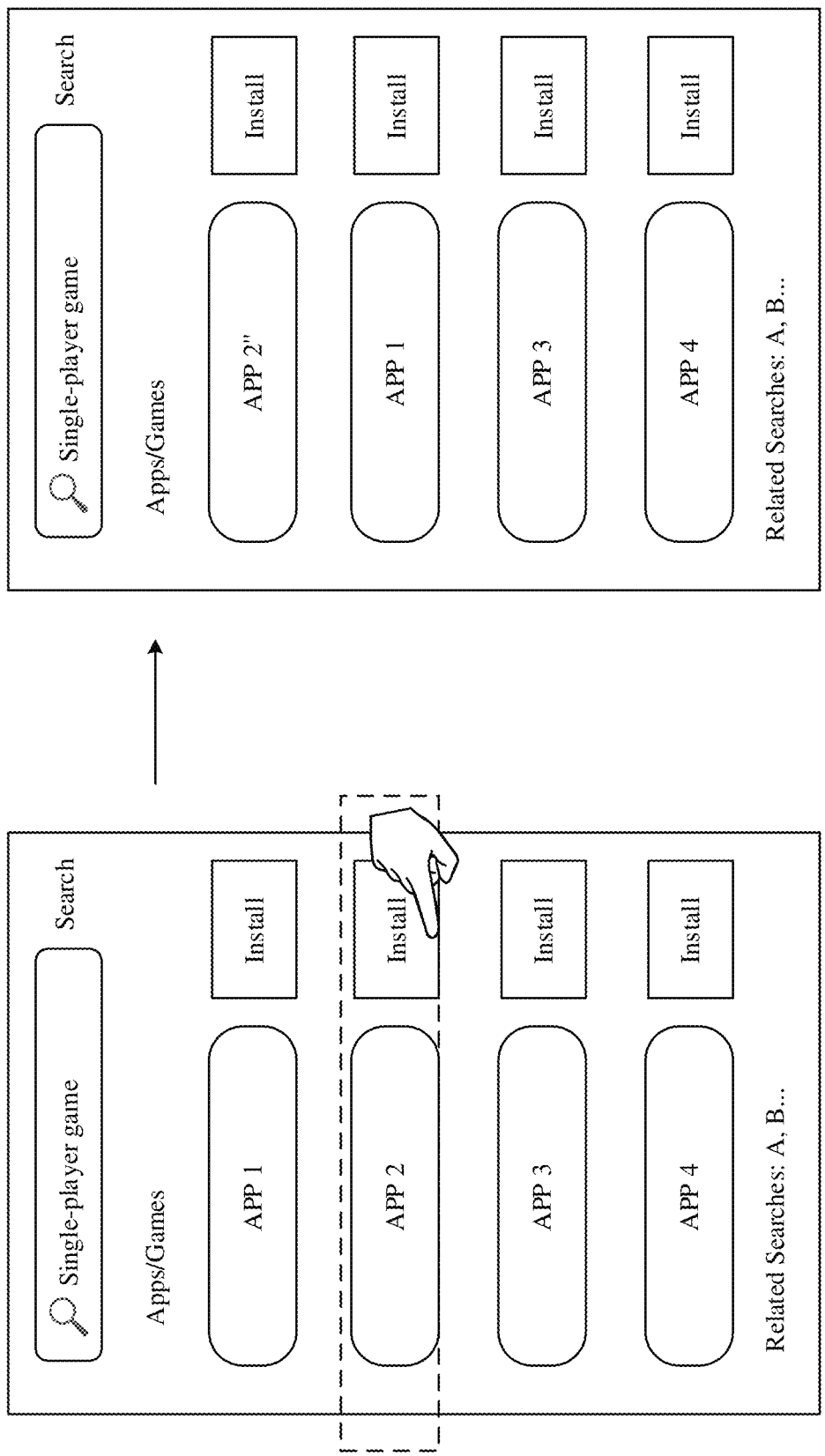
FIG. 11 is a schematic diagram of search recommendation objects on an application store according to an embodiment of the present disclosure.

FIG. 11 is a schematic diagram of search recommendation objects on an application store according to an embodiment of the present disclosure.

As shown in FIG. 11, a user opens the application store on a smart terminal, and may input a current search term "single-player game" (for example, a query field) in a search box. After a search is performed by using a search word, returned search results may be obtained. For example, the search results may include App1, App2, App3, and App4. The user may click App2 in the search results. In this case, data of a response operation performed by the user may be stored in a user behavior log. Next, when the user inputs the same search word in the search box of the application store, newly displayed sorted search results are shown in FIG. 11. Herein, App2" may be placed at a front location, where App2" may represent the same App as App2, or may represent the same type of App as App2.

It should be noted that a process in which the user inputs the search word in the search box may be that the user inputs the search word in a voice manner. Alternatively, the user may manually input the search word on a screen of the smart terminal. This is not limited in embodiments of the present disclosure.

For example, a search term "single-player game" is used as an example for description. If the user once clicks the "Plants vs. Zombies 2", the search recommendation model provided in this embodiment is used to place the "Plants vs. Zombies: All Stars" at a front location in the search results next time the user inputs the "single-player game" or a search word similar to a "word game". Alternatively, if the user once clicks the "single-player game: Fight the Landlords (happy version)", the search recommendation model provided in this embodiment places the "June single-player game: Fight the Landlords" at a front location in search results next time the user inputs the "single-player game" or the search word similar to the "word game". Alternatively, if the user once clicks the "single-player link game", the search recommendation model provided in this embodiment places the "Anipop" at a front location in search results next time the user inputs the "single-player game" or the search word similar to the "word game". Similarly, if a category of an App that the user clicks at this time changes, a change of a recent hobby of the user can be captured by using the search recommendation model in the present disclosure, to obtain dynamically adjusted sorted search results.

It should be understood that the foregoing is an example description, and the search results that correspond to the search word and that are returned by the application store are not limited to the foregoing example description.

It should be understood that the following example descriptions are merely intended to help a person skilled in the art understand embodiments of the present disclosure, instead of limiting embodiments of the present disclosure to a specific value or a specific scenario shown in the examples. A person skilled in the art definitely can make various equivalent modifications or changes based on the examples described above, and such modifications or changes also fall within the scope of embodiments of the present disclosure.

The foregoing describes in detail the method for training a search recommendation model and a method for sorting search results in embodiments of the present disclosure with reference to FIG. 1 to FIG. 11. The following describes in detail apparatus embodiments in the present disclosure with reference to FIG. 12 to FIG. 15.

It should be understood that the training apparatus in this embodiment may perform the method for training a search recommendation model in embodiments of the present disclosure, and the apparatus for sorting search results may perform the method for sorting search results in embodiments of the present disclosure. For a specific working process of the following products, refer to a corresponding process in the foregoing method embodiments.

FIG. 11 is a schematic block diagram of an apparatus for training a search recommendation model according to an embodiment of the present disclosure.

It should be understood that the training apparatus 900 may perform the method for training a search recommendation model shown in FIG. 5. The training apparatus 900 includes an obtaining unit 910 and a processing unit 920.

The obtaining unit 910 is configured to obtain a training sample set. The training sample set includes a sample user behavior group sequence and a masked sample user behavior group sequence. The sample user behavior group sequence includes a first query field and an object of a response operation of a sample user in search results corresponding to the first query field. The masked sample user behavior group sequence includes a second query field and a sequence obtained after mask processing is performed on an object of a response operation of the sample user in search results corresponding to the second query field. The processing unit 920 is configured to: use the training sample set as input data, and train a search recommendation model, to obtain the trained search recommendation model, where a training target is to obtain the object of the response operation of the sample user after the mask processing. The search recommendation model is used to predict a label of a candidate recommendation object in search results corresponding to a query field when a target user inputs the query field. The label is used to indicate a probability that the target user performs a response operation on the candidate recommendation object.

Optionally, in an embodiment, the search recommendation model predicts the label of the candidate recommendation object based on the query field input by the target user and the historical behavior group sequence of the target user. The historical behavior group sequence of the target user is obtained based on the historical query field of the target user and the historical behavior data corresponding to the historical query field. The historical behavior data corresponding to the historical query field is an object of a response operation performed by the target user on the search results corresponding to the historical query field.

Optionally, in an embodiment, the sample user behavior group sequence further includes identification information. The identification information is used to indicate an association relationship between the first query field and the object of the response operation of the sample user. The identification information includes a time identifier.

Optionally, in an embodiment, the search recommendation model is a bidirectional encoder representations from transformers (BERT) model. The processing unit 920 is further configured to: perform vectorization processing on the sample user behavior group sequence and the masked sample user behavior group sequence, to obtain a vector sequence.

The processing unit 920 is further configured to input the vector sequence to the BERT model.

Optionally, in an embodiment, the response operation of the sample user includes one or more of a click operation, a download operation, a purchase operation, or a browse operation of the sample user.

Figure 12:
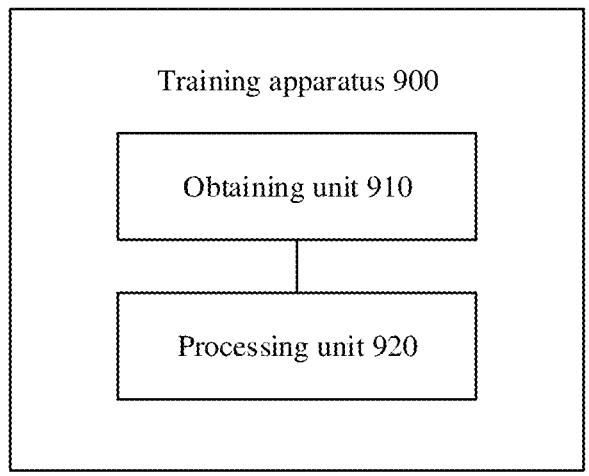
FIG. 12 is a schematic block diagram of an apparatus for training a search recommendation model according to an embodiment of the present disclosure.
Figure 13:
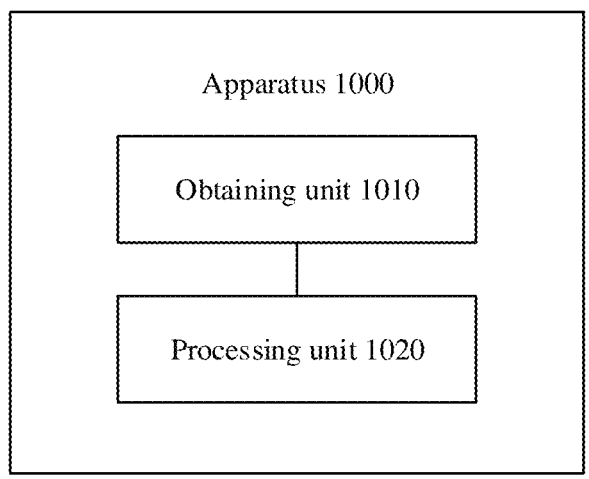
FIG. 13 is a schematic block diagram of an apparatus for sorting search results according to an embodiment of the present disclosure.

FIG. 12 is a schematic block diagram of an apparatus for sorting search results according to an embodiment of the present disclosure.

It should be understood that the apparatus 1000 may perform the method for sorting search results shown in FIG. 10. The apparatus 1000 includes an obtaining unit 1010 and a processing unit 1020.

The obtaining unit 1010 is configured to obtain a to-be-processed user behavior group sequence of a user. The to-be-processed user behavior group sequence includes a current query field of the user and a sequence obtained after mask processing is performed on an object of a response operation of the user. The processing unit 1020 is configured to: input the to-be-processed behavior group sequence to a pre-trained search recommendation model, to obtain a label of a candidate recommendation object in a candidate recommendation object set corresponding to the current query field, where the label is used to indicate a probability that the user performs a response operation on the candidate recommendation object in the candidate recommendation object set; and obtain, based on the label of the candidate recommendation object, sorted search results corresponding to the current query field. The search recommendation model is used to predict a label of a candidate recommendation object in search results corresponding to a query field when a target user inputs the query field. The search recommendation model is obtained through using a training sample set as input data and performing training with a training target of obtaining an object of a response operation of a sample user after mask processing. The training sample set includes a sample user behavior group sequence and a masked sample user behavior group sequence. The training sample set includes a sample user behavior group sequence and a masked sample user behavior group sequence. The sample user behavior group sequence includes a first query field and an object of a response operation of a sample user in search results corresponding to the first query field. The masked sample user behavior group sequence includes a second query field and a sequence obtained after mask processing is performed on an object of a response operation of the sample user in search results corresponding to the second query field.

Optionally, in an embodiment, the search recommendation model predicts the label of the candidate recommendation object based on the query field input by the target user and a historical behavior group sequence of the target user. The historical behavior group sequence of the target user is obtained based on a historical query field of the target user and historical behavior data corresponding to the historical query field. The historical behavior data corresponding to the historical query field is an object of a response operation performed by the target user on the search results corresponding to the historical query field.

Optionally, in an embodiment, the sample user behavior group sequence further includes identification information. The identification information is used to indicate an association relationship between the first query field and the object of the response operation of the sample user. The identification information includes a time identifier.

Optionally, in an embodiment, the pre-trained search recommendation model is a bidirectional encoder representations from transformers (BERT) model. The training sample set is obtained through performing vectorization processing on the sample user behavior group sequence and the masked sample user behavior group sequence.

Optionally, in an embodiment, the response operation of the user includes one or more of a click operation, a download operation, a purchase operation, or a browse operation of the user.

It should be noted that the training apparatus 900 and the apparatus 1000 are displayed in a form of function units. The term "unit" herein may be implemented in a form of software and/or hardware. This is not specifically limited.

For example, the "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described function.

Therefore, in the examples described in embodiments of the present disclosure, units may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Figure 14:
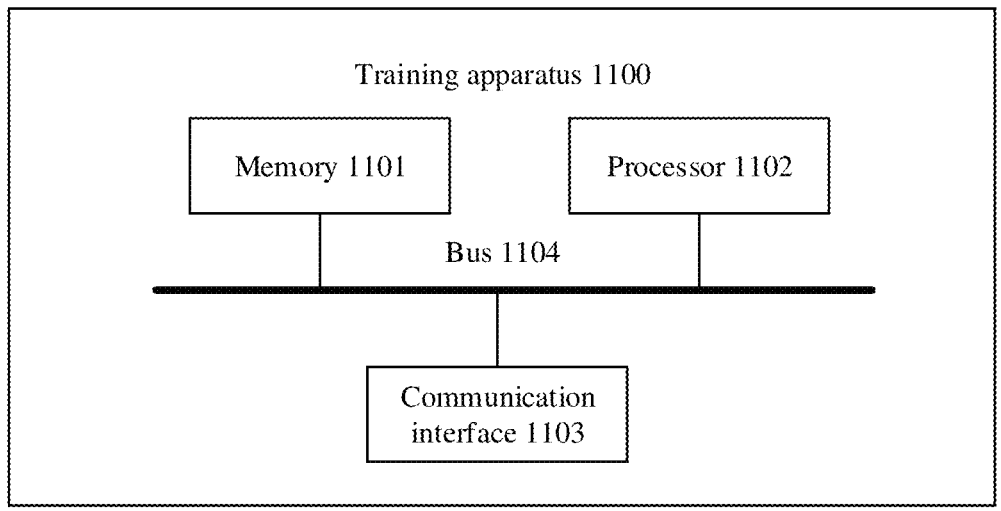
FIG. 14 is a schematic block diagram of an apparatus for training a search recommendation model according to an embodiment of the present disclosure.

FIG. 14 is a schematic diagram of a hardware structure of an apparatus for training a search recommendation model according to an embodiment of the present disclosure.

The training apparatus 1100 (the training apparatus 1100 may be a computer device) shown in FIG. 14 includes a memory 1101, a processor 1102, a communication interface 1103, and a bus 1104. A communication connection is implemented between the memory 1101, the processor 1102, and the communication interface 1103 by using the bus 1104.

The memory 1101 may be a read-only memory (ROM), a static storage device, a dynamic storage device, or a random access memory (RAM). The memory 1101 may store a program. When the program stored in the memory 1101 is executed by the processor 1102, the processor 1102 is configured to perform steps of the method for training a search recommendation model in the method embodiments of the present disclosure, for example, perform steps shown in FIG. 5.

It should be understood that the training apparatus shown in this embodiment may be a server, for example, may be a server of a cloud, or may be a chip configured in a server of a cloud.

The processor 1102 may be a general-purpose central processing unit (CPU), a microprocessor, an application-specific integrated circuit (ASIC), or one or more integrated circuits, and is configured to execute a related program, to implement the method for training a search recommendation model in the method embodiments of the present disclosure.

Alternatively, the processor 1102 may be an integrated circuit chip, and has a signal processing capability. In an implementation process, the steps of the method for training a search recommendation model in the present disclosure may be completed by using an integrated logic circuit in a form of hardware or an instruction in a form of software in the processor 1102.

The processor 1102 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in embodiments of the present disclosure. The general-purpose processor may be a microprocessor, or the processor may be any conventional processor or the like. Steps of the methods disclosed with reference to embodiments of the present disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1101. The processor 1102 reads information in the memory 1101, and completes, in combination with hardware of the processor 1102, the functions that need to be performed by the units included in the training apparatus shown in FIG. 12 in this embodiment, or performs the method for training a search recommendation model shown in FIG. 5 in the method embodiment of the present disclosure.

The communication interface 1103 uses a transceiver apparatus, for example but not limited to, a transceiver, to implement communication between the training apparatus 1100 and another device or a communication network.

The bus 1104 may include a channel through which information is transmitted between parts (for example, the memory 1101, the processor 1102, and the communication interface 1103) of the training apparatus 1100.

Figure 15:
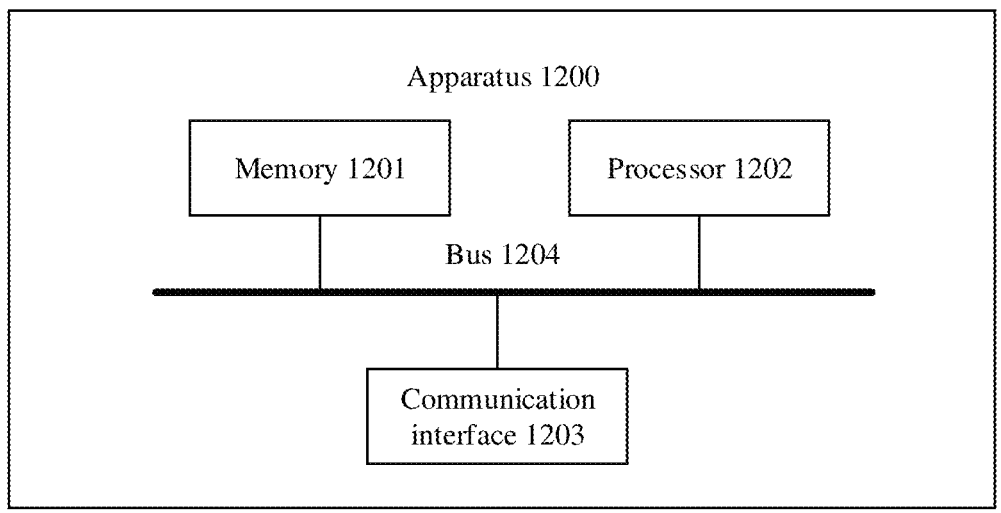
FIG. 15 is a schematic block diagram of an apparatus for sorting search results according to an embodiment of the present disclosure.

FIG. 15 is a schematic diagram of a hardware structure of an apparatus for sorting search results according to an embodiment of the present disclosure.

The apparatus 1200 (the apparatus 1200 may be a computer device) shown in FIG. 15 includes a memory 1201, a processor 1202, a communication interface 1203, and a bus 1204. A communication connection is implemented between the memory 1201, the processor 1202, and the communication interface 1203 by using the bus 1204.

The memory 1201 may be a read-only memory (ROM), a static storage device, a dynamic storage device, or a random access memory (RAM). The memory 1201 may store a program. When the program stored in the memory 1201 is executed by the processor 1202, the processor 1202 is configured to perform steps of the method for sorting search results in embodiments of the present disclosure, for example, perform steps shown in FIG. 10.

It should be understood that the apparatus shown in this embodiment may be a smart terminal, or may be a chip configured in the smart terminal.

The processor 1202 may be a general-purpose central processing unit (CPU), a microprocessor, an application-specific integrated circuit (ASIC), or one or more integrated circuits, and is configured to execute a related program, to implement the method for sorting search results in embodiments of the present disclosure.

The processor 1202 may alternatively be an integrated circuit chip and has a signal processing capability. In an implementation process, the steps of the method for sorting search results in the present disclosure may be completed by using an integrated logic circuit in a form of hardware or an instruction in a form of software in the processor 1202.

The processor 1202 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in embodiments of the present disclosure. The general-purpose processor may be a microprocessor, or the processor may be any conventional processor or the like. Steps of the methods disclosed with reference to embodiments of the present disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1201. The processor 1202 reads information in the memory 1201, and completes, in combination with hardware of the processor 1202, the functions that need to be performed by the units included in the apparatus shown in FIG. 13 in this embodiment, or performs the method for sorting search results shown in FIG. 10 in the method embodiment of the present disclosure.

The communication interface 1203 uses a transceiver apparatus, for example but not limited to, a transceiver, to implement communication between the apparatus 1200 and another device or a communication network.

The bus 1204 may include a channel through which information is transmitted between parts (for example, the memory 1201, the processor 1202, and the communication interface 1203) of the apparatus 1200.

It should be noted that although only the memory, the processor, and the communication interface of each of the training apparatus 1100 and the apparatus 1200 are illustrated, in a specific implementation process, a person skilled in the art should understand that the training apparatus 1100 and the apparatus 1200 each further include other components necessary for implementing normal operation. In addition, based on a specific requirement, a person skilled in the art should understand that the training apparatus 1100 and the apparatus 1200 each may further include a hardware component for implementing another additional function.

In addition, a person skilled in the art should understand that the training apparatus 1100 and the apparatus 1200 each may include only components necessary for implementing embodiments of the present disclosure, but not necessarily include all the components shown in FIG. 14 or FIG. 15.

An embodiment of the present disclosure further provides a chip. The chip includes a transceiver unit and a processing unit. The transceiver unit may be an input/output circuit or a communication interface. The processing unit is a processor, a microprocessor, or an integrated circuit integrated on the chip. The chip may perform the method for training a search recommendation model in the foregoing method embodiment.

An embodiment of the present disclosure further provides a chip. The chip includes a transceiver unit and a processing unit. The transceiver unit may be an input/output circuit or a communication interface. The processing unit is a processor, a microprocessor, or an integrated circuit integrated on the chip. The chip may perform the method for sorting search results in the foregoing method embodiment.

An embodiment of the present disclosure further provides a computer-readable storage medium. The computer-readable storage medium stores instructions. When the instructions are executed, the method for training a search recommendation model in the foregoing method embodiment is executed.

An embodiment of the present disclosure further provides a computer-readable storage medium. The computer-readable storage medium stores instructions. When the instructions are executed, the method for sorting search results in the foregoing method embodiment is executed.

An embodiment of the present disclosure further provides a computer program product including instructions. When the instructions are executed, the method for training a search recommendation model in the foregoing method embodiment is executed.

An embodiment of the present disclosure further provides a computer program product including instructions. When the instructions are executed, the method for sorting search results in the foregoing method embodiment is executed.

It should be understood that, the processor in embodiments of the present disclosure may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of the present disclosure may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and indicates that three relationships may exist. For example, A and/or B may indicate any one of the following three cases: Only A exists, both A and B exist, or only B exists. A and B may be singular or plural. In addition, the character "/" in this specification usually indicates an "or" relationship between associated objects, or may indicate an "and/or" relationship. A specific meaning depends on the context.

In the present disclosure, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate a, b, c, a-b, a-c, b-c, or a-b-c, where a, b, and c may be singular or plural.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of embodiments of the present disclosure.

A person of ordinary skill in the art understand that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed systems, apparatuses, and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. A training method for training a search recommendation model, comprising:
    obtaining a training sample set, wherein the training sample set comprises a sample user behavior group sequence and a masked sample user behavior group sequence, the sample user behavior group sequence comprises a first query field and an object of a response operation of a sample user in search results corresponding to the first query field, and the masked sample user behavior group sequence comprises a second query field and a sequence obtained after mask processing is performed on an object of a response operation of the sample user in search results corresponding to the second query field; and using the training sample set as input data, and training a search recommendation model, to obtain a trained search recommendation model, wherein the object of the response operation of the sample user after the mask processing is obtained through the training of the search recommendation model, a label of a candidate recommendation object in search results corresponding to a query field is predicted using the search recommendation model when a target user inputs the query field, and the label indicates a probability that the target user performs a response operation on the candidate recommendation object.

2. The training method according to claim 1, wherein the search recommendation model predicts the label of the candidate recommendation object based on the query field input by the target user and a historical behavior group sequence of the target user, the historical behavior group sequence of the target user is obtained based on a historical query field of the target user and historical behavior data corresponding to the historical query field, and the historical behavior data corresponding to the historical query field is an object of a response operation performed by the target user on the search results corresponding to the historical query field.

3. The training method according to claim 1, wherein the sample user behavior group sequence further comprises identification information, the identification information indicates an association relationship between the first query field and the object of the response operation of the sample user, and the identification information comprises a time identifier.

4. The training method according to claim 1, wherein the search recommendation model is a bidirectional encoder representations from transformers (BERT) model, and the method further comprises:
performing vectorization processing on the sample user behavior group sequence and the masked sample user behavior group sequence, to obtain a vector sequence; and
the using of the training sample set as input data comprises:
inputting the vector sequence to the BERT model.

5. The training method according to claim 1, wherein the response operation of the sample user comprises one or more of a click operation, a download operation, a purchase operation, or a browse operation of the sample user.

6. A non-transitory computer-readable medium, storing program code that, when executed by a computer, enables the computer to perform the training method according to claim 1.

7. A method for sorting search results, comprising:
obtaining a user behavior group sequence of a user, wherein the user behavior group sequence comprises a current query field of the user and a sequence obtained after mask processing is performed on an object of a response operation of the user;
inputting the user behavior group sequence to a pre-trained search recommendation model, to obtain a label of a candidate recommendation object in a candidate recommendation object set corresponding to the current query field, wherein the label indicates a probability that the user performs a response operation on the candidate recommendation object in the candidate recommendation object set; and
obtaining, based on the label of the candidate recommendation object, sorted search results corresponding to the current query field, wherein a label of a candidate recommendation object in search results corresponding to a query field is predicted using the search recommendation model when a target user inputs the query field, the search recommendation model is obtained through using a training sample set as input data and performing training with a training target of obtaining an object of a response operation of a sample user after mask processing, the training sample set comprises a sample user behavior group sequence and a masked sample user behavior group sequence, the sample user behavior group sequence comprises a first query field and an object of a response operation of a sample user in search results corresponding to the first query field, and the masked sample user behavior group sequence comprises a second query field and a sequence obtained after mask processing is performed on an object of a response operation of the sample user in search results corresponding to the second query field.

8. The method according to claim 7, wherein the search recommendation model predicts the label of the candidate recommendation object based on the query field input by the target user and a historical behavior group sequence of the target user, the historical behavior group sequence of the target user is obtained based on a historical query field of the target user and historical behavior data corresponding to the historical query field, and the historical behavior data corresponding to the historical query field is an object of a response operation performed by the target user on the search results corresponding to the historical query field.

9. The method according to claim 7, wherein the sample user behavior group sequence further comprises identification information, the identification information indicates an association relationship between the first query field and the object of the response operation of the sample user, and the identification information comprises a time identifier.

10. The method according to claim 7, wherein the pre-trained search recommendation model is a bidirectional encoder representations from transformers (BERT) model, the training sample set is obtained through performing vectorization processing on the sample user behavior group sequence and the masked sample user behavior group sequence.

11. The method according to claim 7, wherein the response operation of the user comprises one or more of a click operation, a download operation, a purchase operation, or a browse operation of the user.

12. A non-transitory computer-readable medium, storing program code that, when executed by a computer, enables the computer to perform the method according to claim 7.

13. An apparatus for training a search recommendation model, comprising at least one processor and a memory, wherein the at least one processor is coupled to the memory, and is configured to execute instructions in the memory, to enable the apparatus to perform operations comprising:
obtaining a training sample set, wherein the training sample set comprises a sample user behavior group sequence and a masked sample user behavior group sequence, the sample user behavior group sequence comprises a first query field and an object of a response operation of a sample user in search results corresponding to the first query field, and the masked sample user behavior group sequence comprises a second query field and a sequence obtained after mask processing is performed on an object of a response operation of the sample user in search results corresponding to the second query field; and using the training sample set as input data, and training a search recommendation model, to obtain a trained search recommendation model, wherein the object of the response operation of the sample user after the mask processing is obtained through the training of the search recommendation model, a label of a candidate recommendation object in search results corresponding to a query field is predicted using the search recommendation model when a target user inputs the query field, and the label indicates a probability that the target user performs a response operation on the candidate recommendation object.

14. The apparatus according to claim 13, wherein the search recommendation model predicts the label of the candidate recommendation object based on the query field input by the target user and a historical behavior group sequence of the target user, the historical behavior group sequence of the target user is obtained based on a historical query field of the target user and historical behavior data corresponding to the historical query field, and the historical behavior data corresponding to the historical query field is an object of a response operation performed by the target user on the search results corresponding to the historical query field.

15. The apparatus according to claim 13, wherein the sample user behavior group sequence further comprises identification information, the identification information indicates an association relationship between the first query field and the object of the response operation of the sample user, and the identification information comprises a time identifier.

16. The apparatus according to claim 13, wherein the search recommendation model is a bidirectional encoder representations from transformers (BERT) model, and the processor is configured to execute instructions in the memory, to enable the apparatus to perform operations comprising:
  performing vectorization processing on the sample user behavior group sequence and the masked sample user behavior group sequence, to obtain a vector sequence; and
  inputting the vector sequence to the BERT model.

17. An apparatus for sorting search results, comprising at least one processor and a memory, wherein the at least one processor is coupled to the memory, and is configured to execute instructions in the memory, to enable the apparatus to perform operations comprising:
  obtaining a user behavior group sequence of a user, wherein the user behavior group sequence comprises a current query field of the user and a sequence obtained after mask processing is performed on an object of a response operation of the user;
  inputting the user behavior group sequence to a pre-trained search recommendation model, to obtain a label of a candidate recommendation object in a candidate recommendation object set corresponding to the current query field, wherein the label indicates a probability that the user performs a response operation on the candidate recommendation object in the candidate recommendation object set; and
  obtaining, based on the label of the candidate recommendation object, sorted search results corresponding to the current query field, wherein
  a label of a candidate recommendation object in search results corresponding to a query field is predicted using the search recommendation model when a target user inputs the query field, the search recommendation model is obtained through using a training sample set as input data and performing training with a training target of obtaining an object of a response operation of a sample user after mask processing, the training sample set comprises a sample user behavior group sequence and a masked sample user behavior group sequence, the sample user behavior group sequence comprises a first query field and an object of a response operation of a sample user in search results corresponding to the first query field, and the masked sample user behavior group sequence comprises a second query field and a sequence obtained after mask processing is performed on an object of a response operation of the sample user in search results corresponding to the second query field.

18. The apparatus according to claim 17, wherein the search recommendation model predicts the label of the candidate recommendation object based on the query field input by the target user and a historical behavior group sequence of the target user, the historical behavior group sequence of the target user is obtained based on a historical query field of the target user and historical behavior data corresponding to the historical query field, and the historical behavior data corresponding to the historical query field is an object of a response operation performed by the target user on the search results corresponding to the historical query field.

19. The apparatus according to claim 17, wherein the sample user behavior group sequence further comprises identification information, the identification information indicates an association relationship between the first query field and the object of the response operation of the sample user, and the identification information comprises a time identifier.

20. The apparatus according to claim 17, wherein the search recommendation model is a bidirectional encoder representations from transformers (BERT) model, and the at least one processor is configured to execute instructions in the memory, to enable the apparatus to perform operations comprising:
  performing vectorization processing on the sample user behavior group sequence and the masked sample user behavior group sequence, to obtain a vector sequence; and
  inputting the vector sequence to the BERT model.

* * * * *